United States Patent
Hanada

(10) Patent No.: US 10,831,259 B2
(45) Date of Patent: Nov. 10, 2020

(54) PHOTOELECTRIC SENSOR

(71) Applicant: Keyence Corporation, Osaka (JP)

(72) Inventor: Tomoki Hanada, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 15/805,653

(22) Filed: Nov. 7, 2017

(65) Prior Publication Data

US 2018/0059772 A1 Mar. 1, 2018

Related U.S. Application Data

(63) Continuation of application No. 14/481,934, filed on Sep. 10, 2014, now Pat. No. 9,841,808.

(30) Foreign Application Priority Data

Oct. 23, 2013 (JP) .................................. 2013-220614

(51) Int. Cl.
| | |
|---|---|
| *G06F 3/01* | (2006.01) |
| *G06F 3/0484* | (2013.01) |
| *G01B 11/14* | (2006.01) |
| *G01D 7/00* | (2006.01) |
| *G06T 11/60* | (2006.01) |

(52) U.S. Cl.
CPC ................ *G06F 3/01* (2013.01); *G01B 11/14* (2013.01); *G01D 7/00* (2013.01); *G06F 3/04847* (2013.01); *G06T 11/60* (2013.01)

(58) Field of Classification Search
CPC .................................. G06K 15/02; G09G 5/26

USPC ......................................................... 345/472
See application file for complete search history.

(56) References Cited

U.S. PATENT DOCUMENTS

| | | |
|---|---|---|
| 5,347,117 A | 9/1994 | Fooks et al. |
| 5,907,820 A | 5/1999 | Pan |
| 6,011,467 A | 1/2000 | Kamei et al. |
| 6,094,272 A | 7/2000 | Okamoto |
| 6,211,784 B1 | 4/2001 | Nishide |
| 6,278,526 B1 | 8/2001 | Kurozasa |
| 6,555,806 B2 | 4/2003 | Okamoto |
| 6,642,510 B1 | 11/2003 | Sugiyama et al. |
| 6,717,523 B2 | 4/2004 | Sugiyama |
| 6,803,556 B2 | 10/2004 | Sugiyama |
| 6,838,656 B2 | 1/2005 | Okamoto |
| 6,894,662 B2 | 5/2005 | Fukumura |
| 7,006,942 B2 | 2/2006 | Fukumura |
| 7,053,786 B2 | 5/2006 | Sugiyama |

(Continued)

FOREIGN PATENT DOCUMENTS

| | | |
|---|---|---|
| JP | 2005-210720 | 8/2005 |
| JP | 2007-033097 | 2/2007 |

*Primary Examiner* — Jin Ge

(74) *Attorney, Agent, or Firm* — Kilyk & Bowersox, P.L.L.C.

(57) ABSTRACT

Provided is a photoelectric sensor capable of enhancing display flexibility of a display section mounted on the photoelectric sensor and making this display flexibility contribute to improvement in user's operability. In a Run mode, a current value is displayed in large-sized numerals on a display section. When switching is made from the Run mode to a setting mode and letter information is to be displayed in the setting mode, a current value is displayed in relatively small-sized numerals at the corner (e.g., lower left) of the display section.

12 Claims, 21 Drawing Sheets

(56) References Cited

U.S. PATENT DOCUMENTS

| | | |
|---|---|---|
| 7,098,441 B2 | 8/2006 | Yamaguchi et al. |
| 7,312,854 B2 | 12/2007 | Sugiyama et al. |
| 8,346,510 B2 | 1/2013 | Fukumura et al. |
| 8,378,780 B2 | 2/2013 | Hanada et al. |
| 2002/0104956 A1 | 8/2002 | Okamoto |
| 2002/0130822 A1 | 9/2002 | Fukumura |
| 2002/0163485 A1* | 11/2002 | Sugiyama ............ H03K 17/941 345/39 |
| 2003/0057356 A1 | 3/2003 | Fukumura |
| 2003/0095082 A1 | 5/2003 | Kamei et al. |
| 2004/0124337 A1 | 7/2004 | Gondo et al. |
| 2004/0124342 A1 | 7/2004 | Okamoto |
| 2011/0215221 A1 | 9/2011 | Nakamura et al. |
| 2012/0126100 A1* | 5/2012 | Fukumura ................ G01V 8/10 250/214 SW |
| 2013/0086497 A1 | 4/2013 | Ambuhl et al. |
| 2014/0103198 A1 | 4/2014 | Matsubara et al. |
| 2014/0111814 A1 | 4/2014 | Ohmae et al. |
| 2014/0320538 A1 | 10/2014 | Uemura |
| 2015/0046095 A1 | 2/2015 | Takahashi et al. |
| 2015/0109308 A1 | 4/2015 | Hanada |

\* cited by examiner

PHOTOELECTRIC SENSOR

CROSS-REFERENCE TO RELATED APPLICATIONS

The present application is a continuation of U.S. patent application Ser. No. 14/481,934, filed Sep. 10, 2014, which claims foreign priority based on Japanese Patent Application No. 2013-220614, filed Oct. 23, 2013, the contents of which is incorporated herein by reference.

BACKGROUND OF THE INVENTION

1. Field of the Invention

The present invention relates to a photoelectric sensor provided with a display part.

2. Description of Related Art

There are the following types of photoelectric sensors: a first-type photoelectric sensor that detects presence or absence of an object to be detected (hereinafter, referred to as "workpiece") based on a light reception amount of received light; and a second-type photoelectric sensor that detects the presence or absence of a workpiece mainly based on a distance to the workpiece. The second-type photoelectric sensor is called a "distance setting photoelectric sensor". JP 2005-210720 A (JP 4023621 B2) and U.S. Pat. No. 6,555,806 disclose the first-type photoelectric sensor. JP 2007-33097 A discloses the second-type photoelectric sensor.

Based on their shapes, the photoelectric sensors can be roughly classified into a box-type photoelectric sensor (U.S. Pat. No. 6,555,806) and a slim-type photoelectric sensor (JP 2005-210720 A and JP 2007-33097 A). FIG. 37 shows a photoelectric sensor disclosed in U.S. Pat. No. 6,555,806 as a typical example of the box-type photoelectric sensor. FIG. 38 shows a photoelectric sensor disclosed in JP 2007-33097 A as a typical example of the slim-type photoelectric sensor.

Referring to FIG. 37 that discloses the box-type photoelectric sensor, reference numeral 1 denotes a head unit, reference numeral 2 denotes a main unit, and this main unit 2 corresponds to the box-type photoelectric sensor. The main unit 2 has an amplifier built therein. The head unit 1 is connected to the main unit 2 via cables 3a, 3b.

The sensor head unit 1 emits laser light, which falls on a workpiece W and is reflected thereon, and the sensor head unit 1 receives the reflected light. The main unit 2 compares a light reception amount (current value) of the light received by the sensor head unit 1 with a previously set threshold, to detect the presence or absence of the workpiece.

The main unit 2 has a top surface 2a, namely, an operation surface, in a rectangular shape in a plan view, and a central region of this top surface 2a is provided with a first display section 4 and a second display section 5 both extending in a lateral direction. The first and second display sections 4, 5 are each configured by a seven-segment LED. As can be understood from FIG. 37, comparatively large-sized numerals are displayed on the first display section 4 located in a relatively upper portion, whereas small-sized numerals are displayed on the second display section 5 located in a lower portion.

On the top surface 2a of the main unit 2, a bar display section 6 is disposed using a plurality of indicating lamps (LED) laterally arranged in an upper left portion, and a laser-emitting indicator 7 is disposed below this bar display section 6.

On the top surface 2a of the main unit 2, hold mode indicators 8a, 8b are also disposed on the left of the second display section 5. On the top surface 2a of the main unit 2, a mode switch 9 and a setting switch 10 are further disposed on the right of the first and second display sections 4, 5, and below the mode switch 9 and the setting switch 10, there is disposed an adjustment switch 11 including an up-switch 11u and a down-switch 11d which are laterally arranged. An output of the main unit 2 is performed through a cable denoted by reference numeral 12.

Referring to FIG. 38 that discloses the slim-type photoelectric sensor, reference numeral 20 denotes a head unit and reference numeral 21 denotes a main unit. This main unit 21 corresponds to the distance setting photoelectric sensor. The head unit 20 has a light projection element configured by a laser diode, and a light reception element whose light reception surface is configured by a two-divided PD (photodiode). One divided light reception surface constitutes an N-side (Near-side) light reception surface, and the other divided light reception surface constitutes an F-side (Far-side) light reception surface. A difference between a light reception amount of the N-side light reception surface and a light reception amount of the F-side light reception surface is supplied from the head unit 20 to the main unit 21 through a first cable 22. Further, a drive control signal of the light emitting element is supplied from the main unit 21 to the head unit 20 through a second cable 23 that connects between the head unit 20 and the main unit 21.

The main unit 21 calculates a detected distance of the workpiece W based on the difference between the light reception amount of the N-side light reception surface and the light reception amount of the F-side light reception surface (the difference in light reception amount) received from the head unit 20.

A narrow display section 24 is disposed in a central portion in a longitudinal direction of a narrow top surface 21a, namely, an operation surface, of the main unit 21. The display section 24 is configured by an eight-digit seven-segment LED. An indicator 25 for displaying a result of comparison between a detected distance and a standard distance is disposed in one end section in the longitudinal direction of the narrow top surface 21a. Further, one button switch 26 is disposed adjacent to one end in a longitudinal direction of the display section 24, and a swing switch 27 is disposed adjacent to the other end of the display section 24. Moreover, another button switch 28 is disposed in the other end section of the main unit 21. By use of these switches 26 and 27, a display mode of the display section 24 can be switched, a variety of setting can be made, and a set value can be adjusted. In addition, in FIG. 38, reference numeral 29 denotes an output cable, and reference numeral 30 denotes a lid.

JP 2005-210720 A relates to a slim-type photoelectric sensor, and gives a detailed description of items which are displayed on first and second display sections and shifts of the displays when the eight-digit seven-segment LED is divided into two to form two display sections, i.e., the first and second display sections. For example, there is disclosed an example where a "current value (light reception amount)" is numerically displayed on the first display section and a "threshold" is numerically displayed on the second display section.

As can be easily understood from the detailed descriptions of JP 2005-210720 A, U.S. Pat. No. 6,555,806, and JP 2007-33097 A, as well as FIGS. 37 and 38, the indicator, the display section (seven-segment LED), and the variety of switches are arranged on the top surface 2a (FIG. 37) or 21a (FIG. 38) having a limited area in either the box-type photoelectric sensor (FIG. 37) or the slim-type photoelectric sensor (FIG. 38).

Meanwhile, the photoelectric sensor has been made more multi-functional and further reduced in size. With the multi-functionalization and size reduction in progress, the number of switches cannot be increased. Naturally, it is not permissible to make improvements that lead to deterioration in user's operability. From the viewpoint of the user's operability, as seen in JP 2005-210720 A, U.S. Pat. No. 6,555,806, and JP 2007-33097 A, there have been made a variety of efforts as follows: allocating several functions respectively to a limited number of switches; shifting a numerical value displayed on the display section using the seven-segment LED; displaying characters that can be displayed with the seven-segment LED so that a meaning of each numerical value can be visually understood; and the like. Typical examples of the above include: dividing the eight-digit seven-segment LED into two sections to simultaneously display different kinds of items (information), as disclosed in JP 2005-210720 A; and operating a limited number of switches to shift an item (information) to be displayed on the display section or adjust the displayed set value.

SUMMARY OF THE INVENTION

An object of the present invention is to provide a photoelectric sensor capable of enhancing display flexibility of a display section mounted on the photoelectric sensor, and making this display flexibility contribute to improvement in user's operability.

In order to achieve the above technical object, a first characteristic of a photoelectric sensor of the present invention lies in adoption of a dot-matrix display as a display section. A typical example thereof is a liquid crystal display. By adopting the dot-matrix display, it is possible to acquire display flexibility which is incomparably higher than that of a seven-segment LED.

However, a size of the display section of the photoelectric sensor is limited, and on the other hand, there are various types of information to be displayed due to multi-functionalization of the photoelectric sensor. In the photoelectric sensor that can only adopt a display with a limited display area, even when the dot-matrix display is adopted and the flexibility of a display form instantly increases, it adversely causes the display form of the display section to have an influence on the degree of the user's operability.

Information required by the user at the time of Run of the photoelectric sensor is essentially different from information required by the user at the time of setting a necessary item. Further, when some abnormality occurs, if the dot-matrix display is in use, this abnormal state can be displayed in characters such as letters.

The present invention is a photoelectric sensor which includes a display section configured by a matrix display, and which is capable of switching a display of the display section between a Run mode and a setting mode based on a user's operation.

In the Run mode, a current value is displayed in a main portion of the display section.

In the setting mode, when a setting item which requires display of the current value is displayed on the display section, the current value is displayed in smaller-sized numerals than numerals of the current value that is displayed on the display section in the Run mode, or in a position being offset outward from the main portion of the display section.

As for the setting mode concerning the display of the photoelectric sensor herein, there are a detail setting mode and a manual tuning mode in the embodiment.

Based on the recognition that basic information required by the user is a "current value", the current value to be displayed in the Run mode is displayed in large-sized numerals as much as possible. In other cases, such as when switching is made to a warning screen during Run of the photoelectric sensor, and when the current value is preferably displayed at the time of setting a display form of the display screen or a variety of parameters, the current value are preferably displayed in a position not interfering with the main region of the display section. Further, the current value may be displayed in relatively smaller-sized numerals than the numerals of the current value at the time of Run.

As for the display form of the display section at the time of Run, a plurality of display forms are preferably previously prepared so that the user is allowed to select one out of these display forms. Examples of the display form at the time of Run include a form that simultaneously displays a current value and a threshold. In this case, a display form is preferably prepared in which the current value is displayed in relatively large-sized numerals, and the threshold is displayed in relatively small-sized numerals.

It quite frequently occurs in effect that, during Run with a set value previously set by the user, the set value is to be adjusted. In this case, the operation of the photoelectric sensor needs to be switched from the Run mode to the setting mode for resetting. In that case, the user needs to call a desired setting screen while checking the display of the display section. The photoelectric sensor of the present invention is designed to make switching to the setting screen by one operation at the time of operating the photoelectric sensor in the Run mode (manual tuning in the embodiment corresponds to this). Then, while the user adjusts the set value by viewing the setting screen, the photoelectric sensor operates based on the set value being adjusted, the set value going up or down by the user's operation. After completion of this adjustment, the photoelectric sensor is left untouched for a while, whereby the numerical value after the adjustment is set and the photoelectric sensor is returned to the Run mode.

Other objects of the present invention and effects of the present invention will become obvious from detailed descriptions of the present invention as follows.

DETAILED DESCRIPTION OF PREFERRED EMBODIMENT EMBODIMENT

Prior to descriptions of a preferred embodiment of the present invention based on the attached drawings, a conceptual configuration of the present invention will be described in the following. A first characteristic of the present invention lies in adoption of a dot-matrix display to a display section of the photoelectric sensor. A typical example of the dot-matrix display is a liquid crystal display (LCD), but it may be an organic EL display. Naturally, it may be a monochrome display, but a color display is typically adopted.

Figure 37:
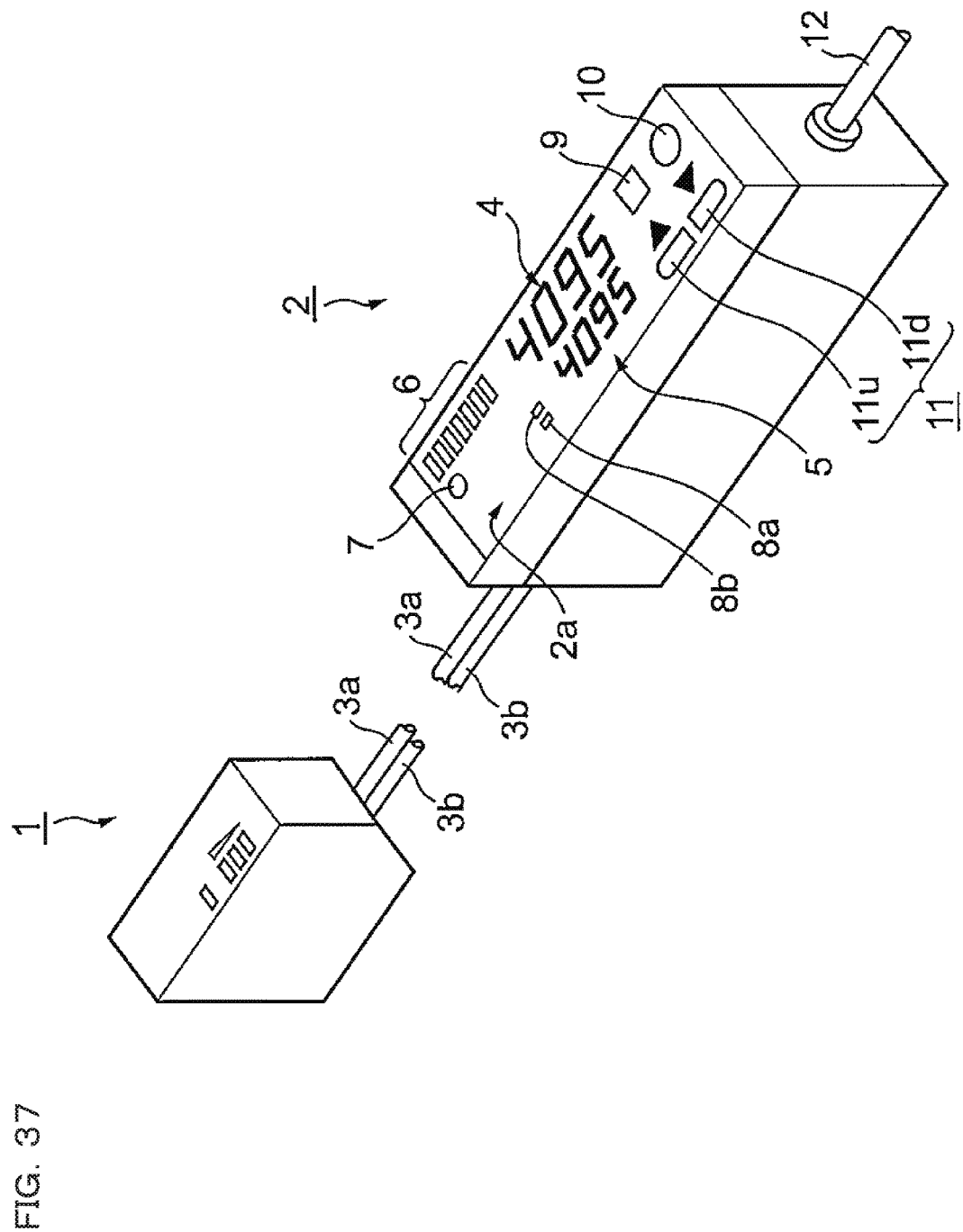
FIG. 37 is a perspective view of a conventional box-type photoelectric sensor extracted from U.S. Pat. No. 6,555,806.
Figure 38:
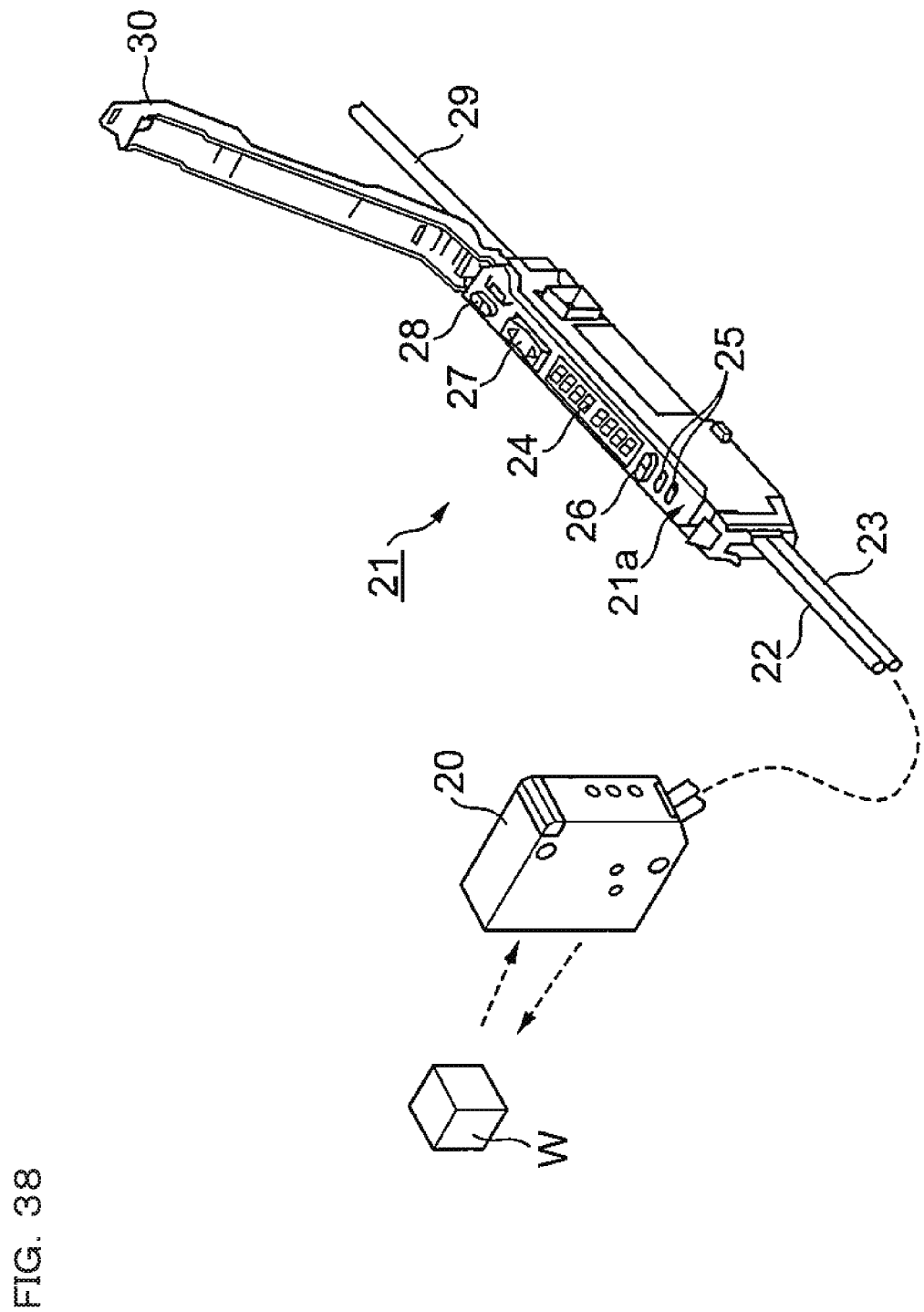
FIG. 38 is a perspective view of a conventional slim-type photoelectric sensor extracted from JP 2007-33097 A.

Display Examples of Box Type (FIGS. 1 to 7):

Reference numeral 100 of each of FIGS. 1 to 7 denotes a rectangular display section preferably adoptable to the box-type photoelectric sensor described with reference to FIG. 37, and this rectangular display section 100 is configured by a dot-matrix display (specifically, a liquid crystal display).

Figure 1:
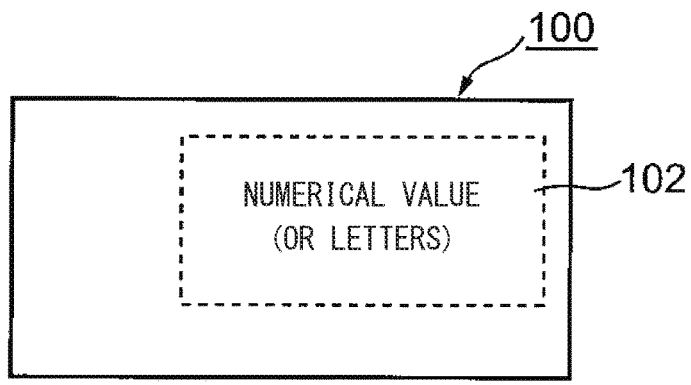
FIG. 1 is a view for explaining a display example applicable to a display of a display section of a photoelectric sensor, taking a rectangular display section of a box-type photoelectric sensor as an example.

In the display example of FIG. 1, a numerical value or letters are displayed in a main region 102 that covers the majority of an area of the display section 100. According to this display example, for example, a numerical value in four to six digits can be laterally and largely displayed. A typical example of this display is a current value (distance or light reception amount) during Run of the photoelectric sensor. Naturally, in the case of displaying numerical value information in large-sized numerals in the main region 102, there may be displayed, to the right or the left thereof, characters such as letter information representing a meaning of this numerical value or representing a state or the like related to this numerical value.

Further, in the case of displaying letter information in this main region 102, many letters can be displayed. When letter information is to be displayed in this main region 102, for example, a current value and a set value are preferably displayed in small-sized numerals in a side position of the main region 102.

Figure 2:
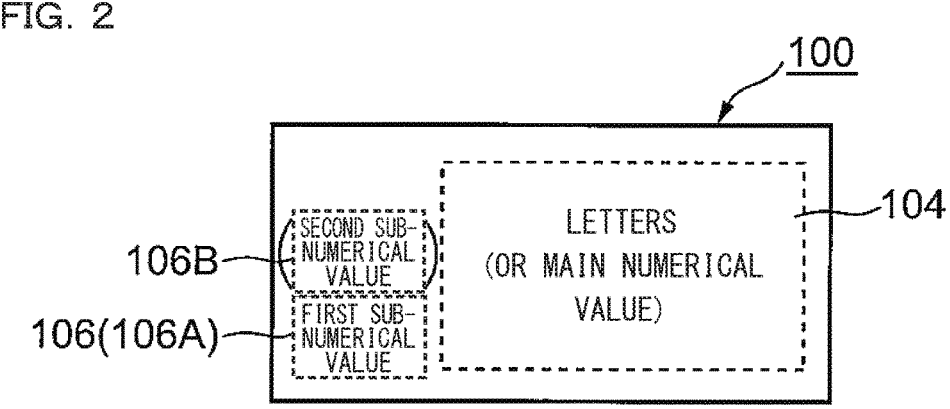
FIG. 2 is a view for explaining another display example applicable to the display of the display section of the photoelectric sensor, taking the rectangular display section of the box-type photoelectric sensor as an example.

The display example of FIG. 2 shows an example of displaying a main region 104 which covers the majority of the area of the display section 100 while leaving the left side thereof uncovered, and displaying a sub-region 106 in a position adjacent to one side, e.g., the left side, of the main region 104 and not interfering with the main region 104. As illustrated, the sub-region 106 may be divided into two sections, first and second sub-regions 106A, 106B, in vertical arrangement not interfering with each other.

In this display example of FIG. 2, typically, main numerical value information most required by the user is displayed large in the main region 104, and sub-numerical value information to be referenced to by the user is displayed relatively small in the sub-region 106. This typical example of the display is a display form at the time of changing a set value (threshold) of the photoelectric sensor. While the continuously changing current value (distance or light reception amount) is displayed in the main region 104, the threshold may be displayed in the first sub-region 106A or the second sub-region 106B. When there are two thresholds, a first threshold may be displayed in the first sub-region 106A and a second threshold may be displayed in the second sub-region 106B.

Further, this display example of FIG. 2 is preferable for displaying an error, a warning, a state of communication with the host equipment side, or the like, by means of letter information. While this letter information is displayed in the main region 104, numerical value information related to the letter information, a current value, and a threshold can be displayed using the sub-region 106.

Naturally, the letter information may be displayed in either one of the first and second sub-regions 106A, 106B, and the numerical value information may be displayed in the other region. When the numerical value information is to be displayed in the main region 104, the first sub-region 106A and/or the second sub-region 106B, characters representing a meaning of this numerical value may be displayed on the right or the left thereof.

Figure 3:
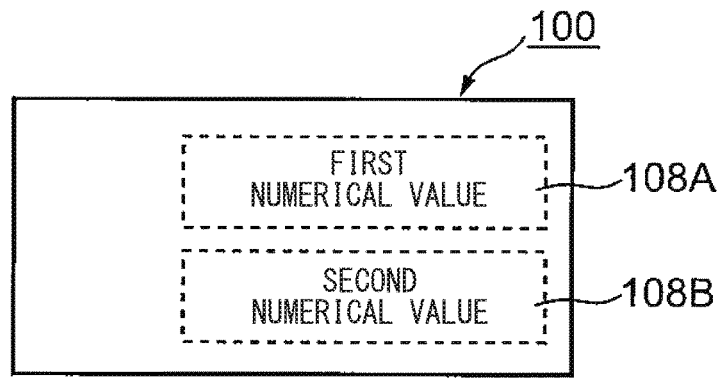
FIG. 3 is a view for explaining a display example preferable for the display of the rectangular display section of the box-type photoelectric sensor.

In the display example of FIG. 3, the display section 100 may be vertically divided into two sections to arrange first and second regions 108A, 108B, and different numerical value information with the same size may be displayed in the first and second regions 108A, 108B. Further, a region to display characters such as letters or symbols may be added to an empty space to the left side of each of the first and second regions 108A, 108B. Naturally, characters representing a meaning of the numerical value may be displayed on the right or the left of the numerical value information displayed in each of the first and second regions 108A, 108B.

Figure 4:
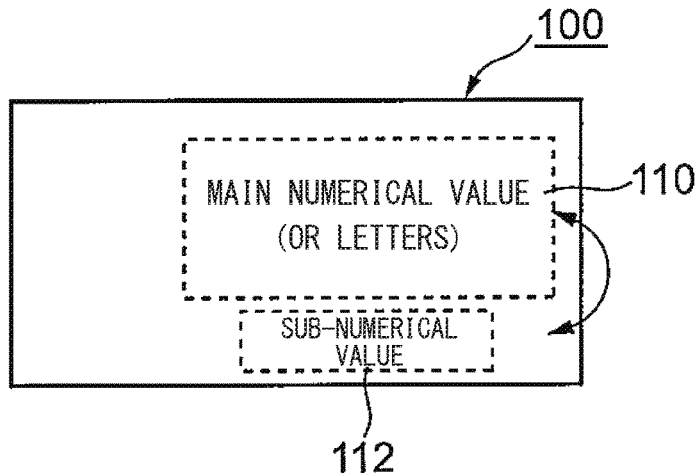
FIG. 4 is a view for explaining another display example preferable for the display of the rectangular display section of the box-type photoelectric sensor.

The display example of FIG. 4 is suitable for separately providing a main region 110 covering the majority of the display section 100 and a sub-region 112 located below the main region 110, displaying main numerical value information most required by the user in large-sized numerals in the main region 110, and displaying sub-information (numerical value or letters) to be referenced to by the user in relatively small-sized numerals in the sub-region 112. Further, a region to display characters such as letters or symbols may be added to an empty space on the left side of the main region 110 and the sub-region 112. Moreover, as indicated by an arrow in FIG. 4, the sub-region 112 may be arranged in an upper portion, and the main region 110 may be arranged in a lower portion.

Figure 5:
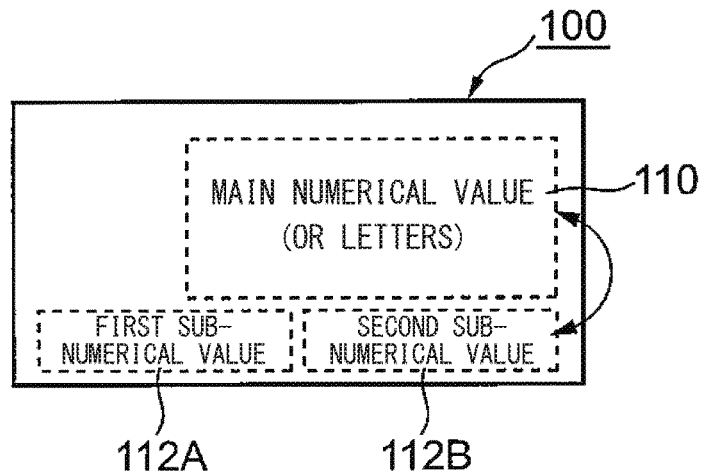
FIG. 5 is a view for explaining a modified example of the display example illustrated in FIG. 4.

A display example of FIG. 5 is also a modified example of the display example of FIG. 4. The sub-region 112 described with reference to FIG. 4 may be divided into first and second sub-regions 112A, 112B in lateral arrangement not interfering with each other. Further, a region to display characters such as letters may be added to an empty space on the left side of the main region 110. Moreover, as indicated by an arrow in FIG. 5, the first and second sub-regions 112A, 112B may be arranged in an upper portion, and the main region 110 may be arranged in a lower portion.

Figure 6:
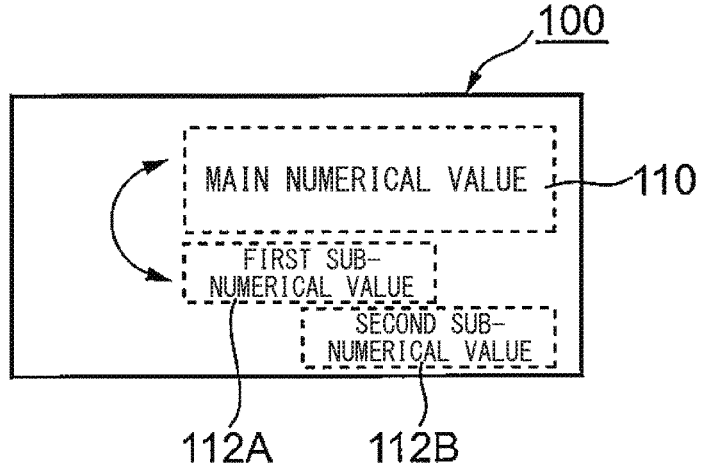
FIG. 6 is a view for explaining a modified example of the display example illustrated in FIG. 5.

A display example of FIG. 6 is also a modified example of the display example of FIG. 5. As seen from FIG. 6, the first and second sub-regions 112A, 112B may be vertically arranged, or the first and second sub-regions 112A, 112B may be laterally offset and arranged. Although different numerical value information may naturally be displayed respectively in the first and second sub-regions 112A, 112B, numerical value information may be displayed in either one of the first and second sub-regions 112A, 112B, and letter information may be displayed in the other of the first and second sub-regions 112A, 112B. Further, a region to display characters such as letters may be added to an empty space on the left side of the main region 110 and the first and second sub-regions 112A, 112B. Moreover, as indicated by an arrow in FIG. 6, at least one region of the first and second sub-regions 112A, 112B may be arranged above the main region 110, and the main region 110 may be arranged therebelow.

Figure 7:
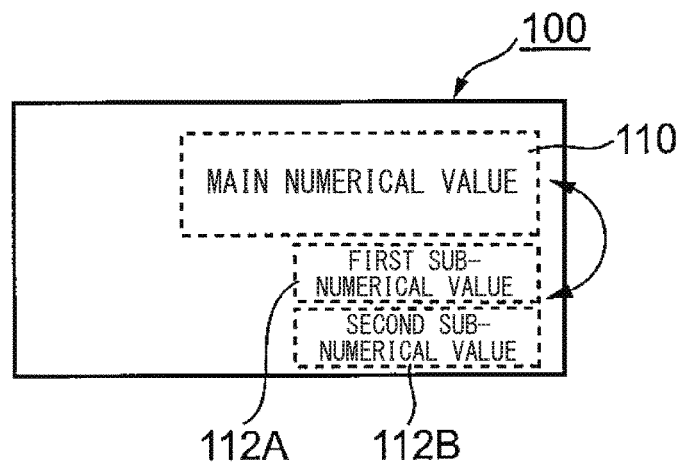
FIG. 7 is a view for explaining a modified example of the display example illustrated in FIG. 6.

A display example of FIG. 7 is also a modified example of the display example of FIG. 6. As seen from FIG. 7, this display example shows an example where, while the first and second sub-regions 112A, 112B are vertically arranged, they are displayed in a vertically aligned state. Also in this display example of FIG. 7, a region to display characters such as letters may be added to an empty space on the left side of the main region 110. Further, a region to display characters such as letters may be added to an empty space on the left side of each of the first and second sub-regions 112A, 112B. Moreover, as indicated by an arrow in FIG. 7, at least one region of the first and second sub-regions 112A, 112B may be arranged above the main region 110, and the main region 110 may be arranged therebelow.

Needless to say, also in the display examples of FIGS. 4 to 7, on the right or the left of numerical value information displayed in each of the main region 110 and the sub-region 112, characters such as letters or symbols representing a meaning of the numerical value may be displayed.

Referring again to FIG. 7, the display example illustrated in FIG. 7 proposes displaying information on vertical three stages in the rectangular display section 100. A current value is typically displayed in the main region 110 on the uppermost stage. A set value (threshold) is typically displayed in the first sub-region 112A on the middle stage. In this example, each of the current value and the threshold has four digits. When numerals of the set value are displayed smaller in size than numerals of the current value, a blank is generated below the middle stage. Using this blank, a second set value may be displayed in the foregoing second sub-region 112B on the lowermost stage. Further, when this second sub-region 112B is set from one end section to the other end section in a width direction of the display section 100, letter information may be displayed using this second sub-region 112B. Naturally, when the number of letters (the number of terms) constituting the letter information is large, a letter size suitable for this second sub-region 112B may be selected. Although the letter size becomes small when the number of letters (the number of terms) is large, the user can immediately recognize a letter string when it has a letter size to such a degree that the letters can be smoothly read by the user.

Naturally, there are various types of letter information to be displayed in the second sub-region 112B depending on the display screen. Large-sized letters may be employed for a display, such as a warning display, to call the user's attention, but except for such a special case, the letter size of the letter information to be displayed in the second sub-region 112B is preferably made uniform.

The display examples described above with reference to FIGS. 1 to 7 may be properly used as appropriate based on information displayed in the display section 100. Although the display of the display section 100 and an operation mode of the photoelectric sensor have hitherto been switched using a variety of switches, with the switching of the display or the change in operation mode, a display form which is easily viewable by the user can be adopted as appropriate.

Mechanical switches have hitherto been used to switch the operation mode of the photoelectric sensor, shift display information, adjust a set value, and the like. A typical example of those switches is a push-type switch, and further, a swing-type switch has been used in adjustment of a set value. As the number of switches becomes larger, the area covered by the display section 100 needs to be made relatively smaller. In other words, as the number of switches becomes smaller, the area covered by the display section 100 can be made relatively larger.

Arrangement Examples of Switches in Box Type (FIGS. 8 to 11):

FIGS. 8 to 11 are views for illustrating arrangement of a mechanical switch 120 related to the display of the rectangular display section 100. The illustrated examples show examples of arranging first, second, and third switches 120A, 120B, and 120C. The first switch 120A is, for example, given a function of switching the display by a long press of three seconds or more or by a short press of one second or less. Further, the second switch 120B is given an up-function of shifting up a selectable item displayed on the display section 100 one by one or increasing a numerical value (typically a set value) displayed on the display section 100. The third switch 120C is given a down-function of shifting down a selectable item displayed on the display section 100 one by one or reducing a numerical value (typically a set value) displayed on the display section 100. These second and third switches 120B, 120C may be configured by swing-type switches.

Figure 8:
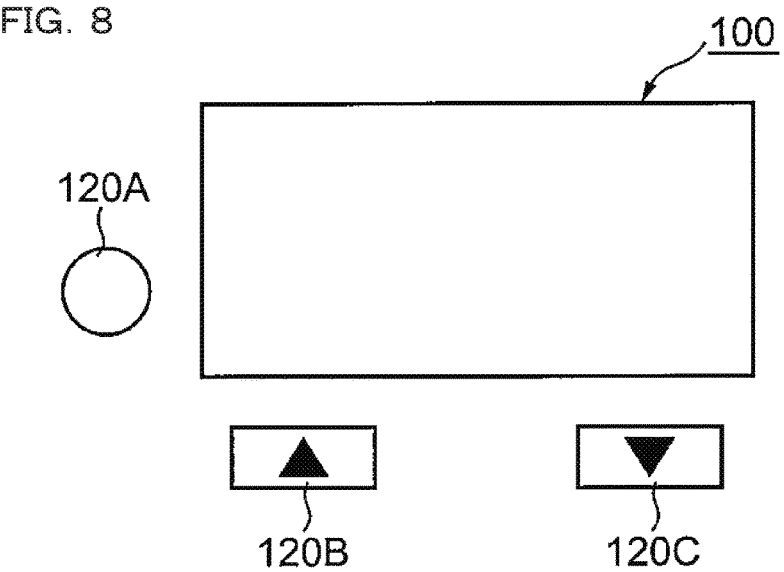
FIG. 8 is a view for explaining an arrangement example of a switch preferably applicable to the box-type photoelectric sensor.
Figure 9:
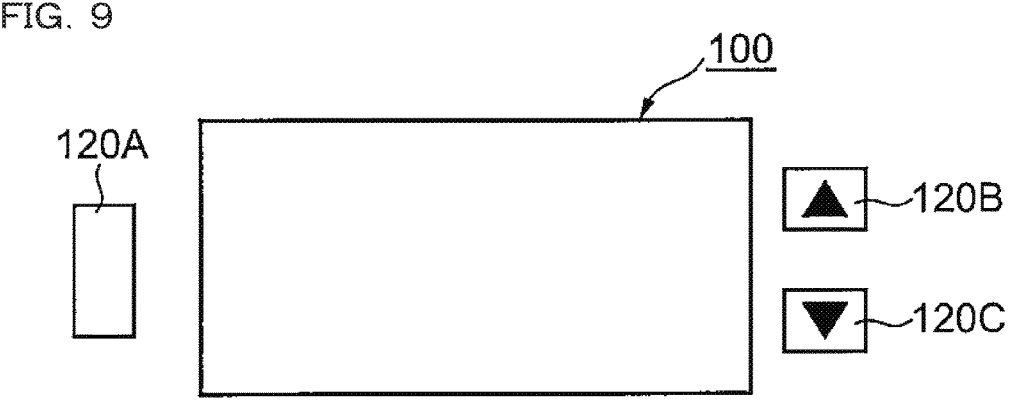
FIG. 9 is a view for explaining another arrangement example of the switch preferably applicable to the box-type photoelectric sensor.
Figure 10:
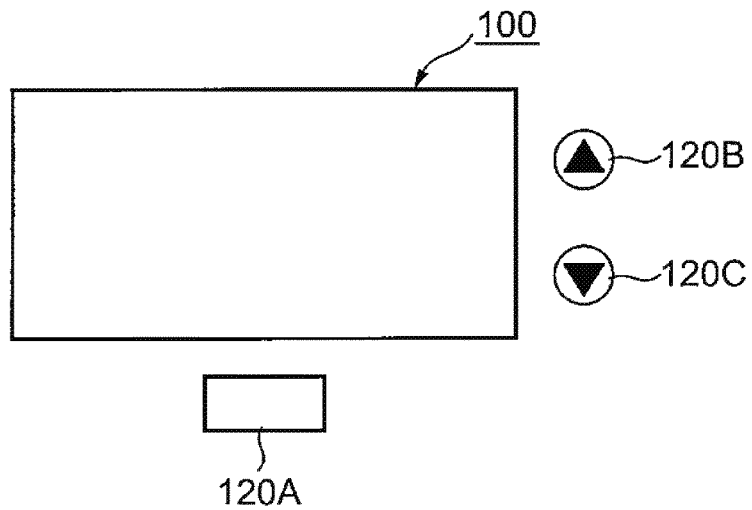
FIG. 10 is a view for explaining another arrangement example of the switch preferably applicable to the box-type photoelectric sensor.
Figure 11:
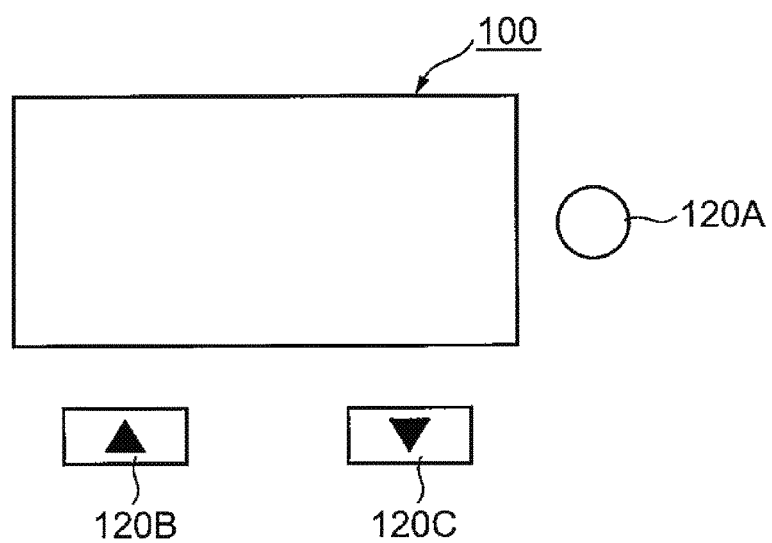
FIG. 11 is a view for explaining still another arrangement example of the switch preferably applicable to the box-type photoelectric sensor.

The arrangement example of FIG. 8 shows an example where the first switch 120A is arranged on the left of the display section 100, and the second and third switches 120B, 120C are laterally arranged below the display section 100. The arrangement example of FIG. 9 shows an example where the first switch 120A is arranged on the left of the display section 100, and the second and third switches 120B, 120C are vertically arranged on the right of the display section 100. The arrangement example of FIG. 10 shows an example where the first switch 120A is arranged below the display section 100, and the second and third switches 120B, 120C are vertically arranged on the right of the display section 100. The arrangement example of FIG. 11 shows an example where the first switch 120A is arranged to the right of the display section 100, and the second and third switches 120B, 120C are laterally arranged below the display section 100. As thus described, the first to third switches 120A, 120B, 120C related to the display of the display section 100 are arranged adjacent to the display section 100, thereby allowing the user to switch the display or adjust a set value without turning away his or her eyes which are focused on the display section 100.

Configuration Examples of Touch Switch in Box Type (FIGS. 12 to 15):

Currently, touch panels have become widespread. This touch panel is a display formed by combining a liquid crystal display and a position input device such as a touch switch, and a pressure-type touch panel and a capacitance-type touch panel have become widespread. The touch panel is also called a "touch screen".

Figure 12:
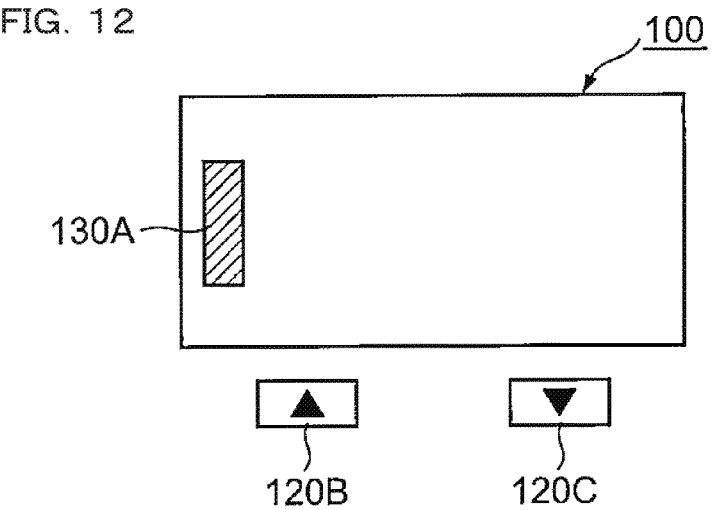
FIG. 12 is a view for explaining an arrangement example of a switch formed by adding a function of a touch switch to part of the display section of the box-type photoelectric sensor.

The whole area of the display section 100 may be formed of the touch panel, but the touch switch may be arranged in part of the display section 100 to partially add a function of the touch panel. FIGS. 12 to 15 are views for explaining arrangement examples of a touch switch 130. FIG. 12 shows an example where a first touch switch 130A is arranged in a left-side section of the display section 100, and a function of the foregoing first switch 120A is allocated to this first touch switch 130A. FIG. 12 shows an example where the second and third switches 120B, 120C are laterally arranged in a lower portion of the display section 100, but the second and third switches 120B, 120C may be vertically arranged in a right-side section of the display section 100.

Figure 13:
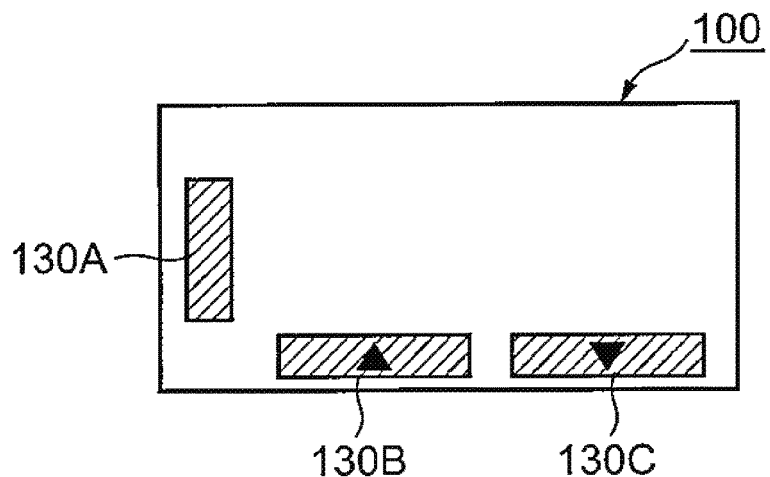
FIG. 13 is a view for explaining another arrangement example of the switch formed by adding the function of the touch switch to part of the display section of the box-type photoelectric sensor.

FIG. 13 shows an example where three touch switches, i.e., first, second and third touch switches 130A, 130B, 130C are arranged. A function of the foregoing second switch 120B is allocated to the second touch switch 130B, and a function of the foregoing third switch 120C is allocated to the third touch switch 130C. The example disclosed in FIG. 13 shows an example where the first touch switch 130A is arranged in the left-side section of the display section 100, and the second and third touch switches 130B, 130C are laterally arranged in a lower end section of the display section 100. As a modified example of this arrangement example illustrated in FIG. 13, the second and third touch switches 130B, 130C may be vertically arranged in a right-side section of the display section 100. Further, the first touch switch 130A may be arranged in the lower end section of the display section 100.

Figure 14:
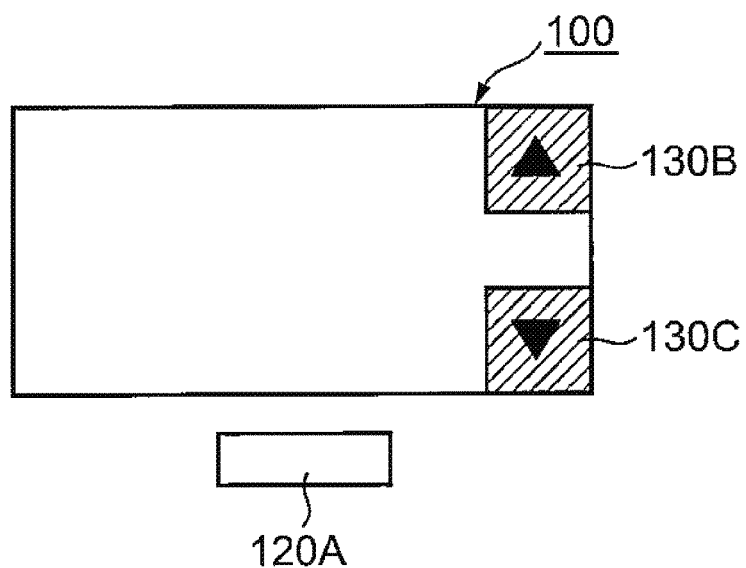
FIG. 14 is a view for explaining another arrangement example of the switch formed by adding the function of the touch switch to part of the display section of the box-type photoelectric sensor.

FIG. 14 shows an example where the first switch 120A is arranged in the lower portion of the display section 100, and the second and third touch switches 130B, 130C are vertically arranged in the right-side section of the rectangular display section 100. As a modified example of this arrangement example of FIG. 14, the second and third touch switches 130B, 130C may be laterally arranged in the lower end section of the display section 100.

Figure 15:
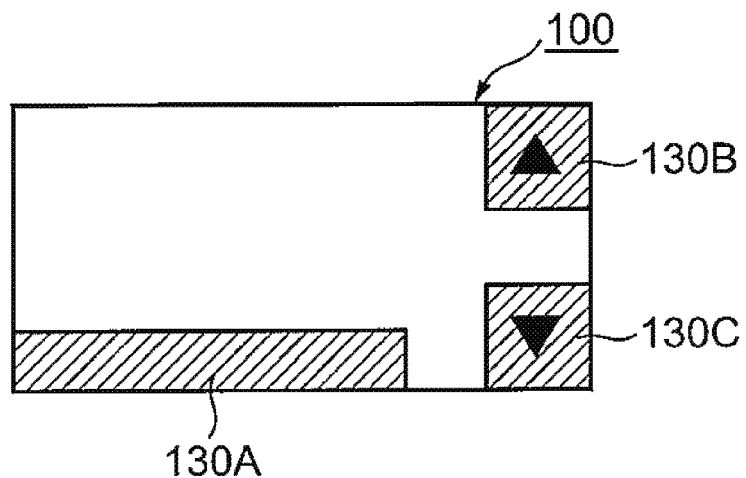
FIG. 15 is a view for explaining still another arrangement example of the switch formed by adding the function of the touch switch to part of the display section of the box-type photoelectric sensor.

FIG. 15 shows an example where the first touch switch 130A is arranged on the left side of the lower end section of the display section 100, and the second and third touch switches 130B, 130C are vertically arranged in the right-side section of the rectangular display section 100. The first touch switch 130A may be arranged at the upper end section of the display section 100.

By adding the function of the touch panel to at least part of the display section 100, it is possible to omit disposition of a mechanical switch, so as to obtain the flexibility for extending a length in a longitudinal direction of the display section 100.

Display Examples of Slim-Type Photoelectric Sensor (FIGS. 16 to 20):

Reference numeral 200 of FIGS. 16 to 20 denotes a narrow display section preferably adoptable to a slim-type photoelectric sensor, and this narrow display section 200 is configured by a dot-matrix display (specifically, a liquid crystal display).

Figure 16:
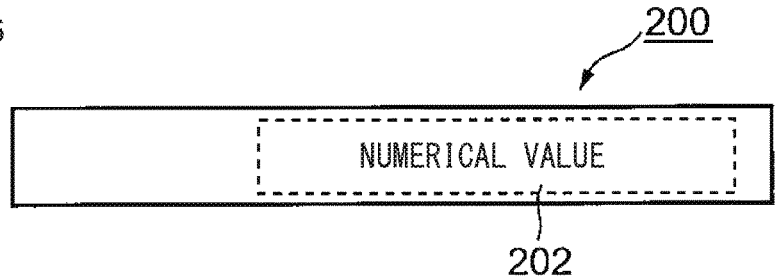
FIG. 16 is a view for explaining a display example preferable for a display of a display section of a slim-type photoelectric sensor.

In a display example of FIG. 16, a numerical value or letters are displayed in a main region 202 that covers the majority of an area of the narrow display section 200. According to this display example, for example, a numerical value of four to eight digits can be laterally and largely displayed. A typical example of this display is a current value (distance or light reception amount) during Run of the photoelectric sensor. Naturally, there may be displayed, on the right or the left of the numerical value, characters representing a meaning of this numerical value or representing a state or the like related to this numerical value. Further, in the case of displaying letter information in this main region 202, many letters can be displayed. When letter information is displayed in this main region 202, a sub-region 204 that displays, for example, a current value or a set value in relatively small-sized numerals is preferably arranged on a side of the main region 202 (FIG. 17).

Figure 18:
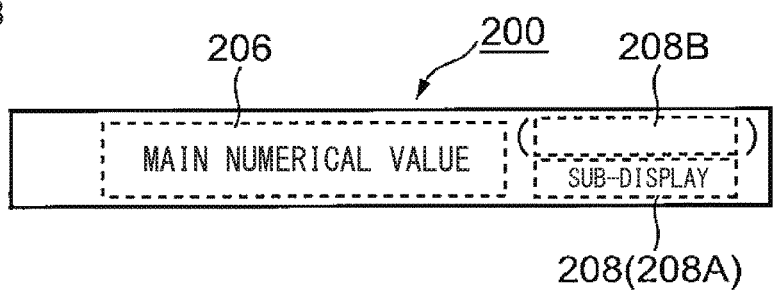
FIG. 18 is a view for explaining another display example preferable for the display of the display section of the slim-type photoelectric sensor.

The display example illustrated in FIG. 18 shows an example where a main region 206 that covers a central portion of the narrow display section 200, and a sub-region 208 adjacent to the right side of the main region 206 are arranged. As illustrated, this sub-region 208 may be vertically divided into two sections, i.e., first and second sub-regions 208A, 208B. In this display example of FIG. 18, typically, main numerical value information most required by the user is displayed large in the main region 206, and sub-numerical value information to be referenced to by the user is displayed small in the sub-region 208. This typical example of the display is a display form at the time of changing a set value (threshold) of the photoelectric sensor. While the continuously-changing current value (distance or light reception amount) may be displayed in the main region 206, a threshold may be displayed in the first sub-region 208A or the second sub-region 208B. When there are two thresholds, a first threshold may be displayed in the first sub-region 208A, and a second threshold may be displayed in the second sub-region 208B.

Figure 19:
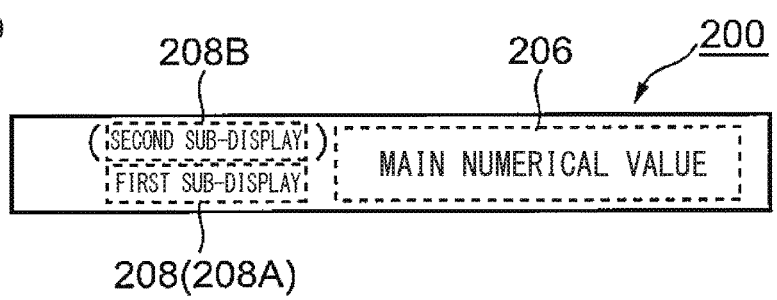
FIG. 19 is a view for explaining a modified example of the display example illustrated in FIG. 18.

FIG. 19 is a modified example of the display example illustrated in FIG. 18. In this display example illustrated in FIG. 19, the main region 206 is arranged in the right side of the narrow display section 200 and the sub-region 208 is arranged in the left side of the main region 206.

Figure 17:
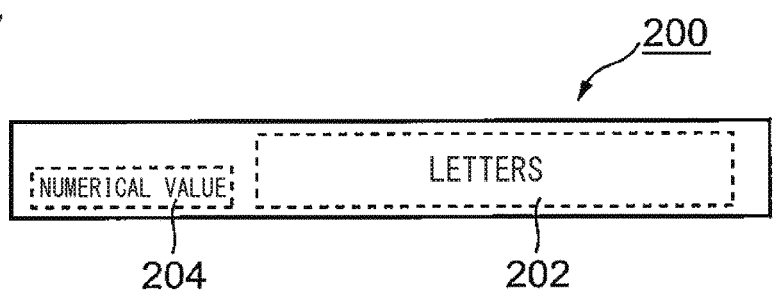
FIG. 17 is a view for explaining another display example preferable for the display of the display section of the slim-type photoelectric sensor.
Figure 20:
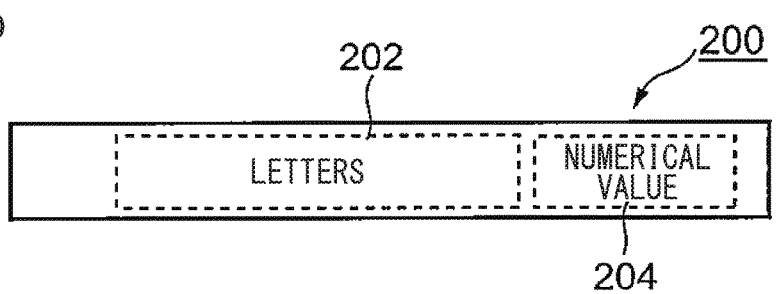
FIG. 20 is a view for explaining a modified example of the display example illustrated in FIG. 17.

FIG. 20 is a modified example of the display example illustrated in FIG. 17. In the display example illustrated in FIG. 17, at the time of displaying letter information in the main region 202, the sub-region 204 that displays a numerical value in relatively small-sized numerals is arranged on the left of the main region 202, but this sub-region 204 may be arranged on the right of the main region 202 (FIG. 20). Further, in FIG. 20, a numerical value is displayed in this sub-region 204 in relatively large-sized numerals. This is also adoptable to the sub-region 204 illustrated in FIG. 17. Naturally, the numerical value may be displayed in this sub-region 204 in relatively small-sized numerals.

Figure 21:
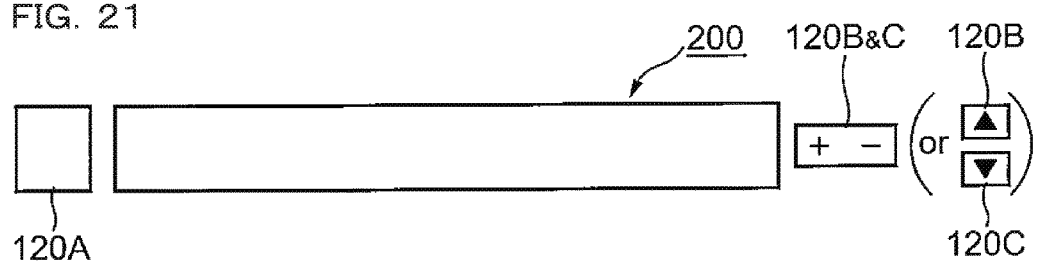
FIG. 21 is a view for explaining an arrangement example of a switch adjacent to a narrow display section of the slim-type photoelectric sensor.

Arrangement Examples of Switches and Arrangement Examples of Touch Switch in Slim-Type Photoelectric Sensor (FIGS. 21 to 23):

When an arrangement example of switches in the slim-type photoelectric sensor is described with reference to FIG. 21 using the reference numerals used in FIGS. 8 to 11 described above, the first switch 120A is preferably arranged adjacent to the left end of the narrow display section 200, and the second and third switches 120B, 120C are preferably vertically arranged adjacent to the right end of the display section 200. These second and third switches 120B, 120C may be configured by a swing switch. Reference numeral 120B&C denote a swing switch. This swing switch 120B&C is preferably swingable with a longitudinal axial line of the narrow display section 200 as the center.

Figure 22:
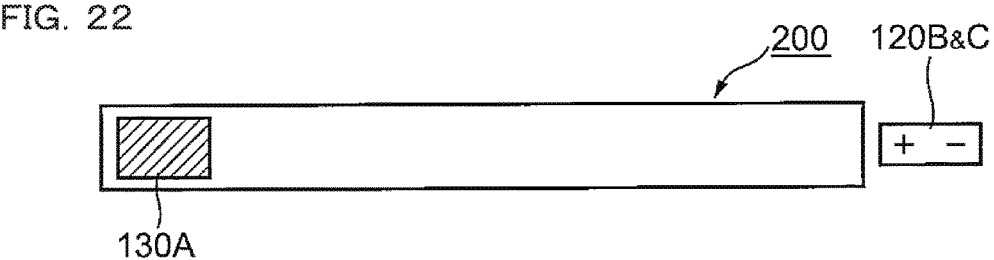
FIG. 22 is a view for explaining an arrangement example of a switch formed by adding a function of a touch switch to part of the narrow display section of the slim-type photoelectric sensor.
Figure 23:
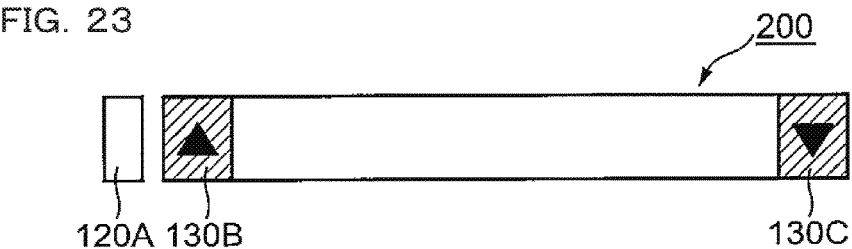
FIG. 23 is a view for explaining another arrangement example of the switch formed by adding the function of the touch switch to part of the narrow display section of the slim-type photoelectric sensor.

FIGS. 22 and 23 are views each showing an example where a touch switch is arranged in part of the narrow display section 200 to partially add the function of the touch panel. Naturally, the whole area of the narrow display section 200 may be formed of the touch panel. The examples illustrated in FIGS. 22 and 23 will be described using the reference numerals used in FIGS. 12 to 15 described above.

FIG. 22 shows an example where the first touch switch 130A is arranged in the left end section of the display section 200, and a function of the foregoing first switch 120A is allocated to this first touch switch 130A. In this example of FIG. 22, the second and third switches 120B, 120C or the swing switch 120B&C is preferably arranged adjacent to the right end of the display section 200.

FIG. 23 shows an example where the second touch switch 130B is arranged in the left end section of the display section 200, and the third touch switch 130C is arranged in a right end section thereof. In this example of FIG. 23, the first switch 120A is preferably arranged adjacent to the left end of the display section 200.

Embodiment

Figure 24:
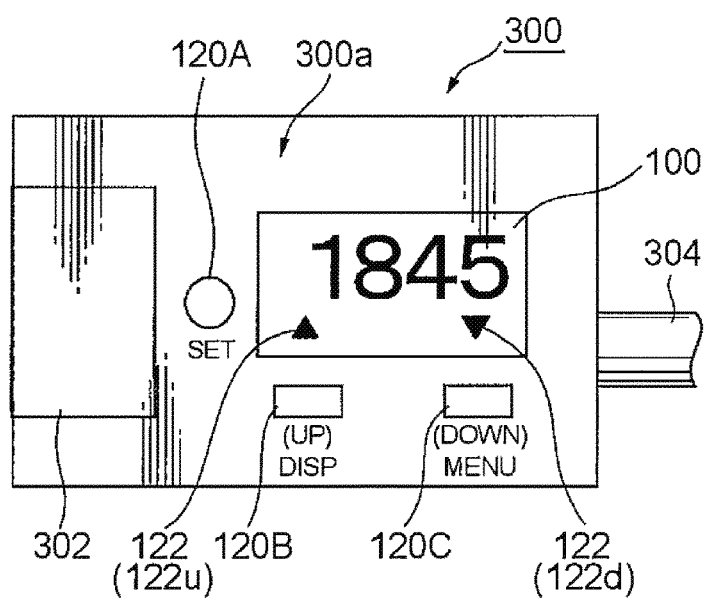
FIG. 24 is a view of an operation surface (top surface) of a distance setting photoelectric sensor in a box shape of an embodiment, seen from above.

FIG. 24 is a plan view of a photoelectric sensor 300 of the embodiment. This photoelectric sensor 300 is a distance setting photoelectric sensor, and a box-type photoelectric sensor. Although the photoelectric sensor of JP 2007-33097 A is the slim-type photoelectric sensor, since an internal configuration of the photoelectric sensor 300 is substantially the same as that of the photoelectric sensor of JP 2007-33097 A, a detailed description thereof is omitted as the disclosure of JP 2007-33097 A is cited in the present specification.

Referring to FIG. 24, a top surface 300a, namely, an operation surface, of the photoelectric sensor 300 is provided with the rectangular display section 100 described with reference to FIGS. 1 to 7, and provided with the first to third button switches 120A to 120C described with reference to FIGS. 8 to 11. The first button switch 120A adjacent to the left end of the display section 100 is referred to as a "SET switch" or a "SET button" in this embodiment. Out of the second and third switches 120B, 120C laterally arranged adjacent to the lower end of the display section 100, the second switch 120B located on the left side is referred to as a "DISP switch", a "DISP button", or an "up-button", while the third switch 120C located relatively on the right side is referred to as a "MENU switch", a "MENU button", or a "down-button.

Still referring to FIG. 24, an output indicator 302 is disposed in a left end section of the top surface 300a of the photoelectric sensor 300. An input/output of the photoelectric sensor 300 is performed through a cable 304. Here, the photoelectric sensor 300 of the embodiment is provided with a function of only displaying a detected distance on the display section 100 without performing an output operation.

FIG. 24 shows an example where triangular-shaped up/down characters 122 are displayed in positions respectively corresponding to the up-button 120B and the down-button 120C in a lower end section of the display section 100. The characters 122 of an up-symbol 122u and a down-symbol 122d may be displayed on the display section 100 restrictively at the time of using the second and third button switches 120B, 120C for an up-down operation for a numerical value or selection such as later-described threshold adjustment or selection in a displayed menu. There may also be adopted a display method for drawing the user's attention, such as flickering or changing of a display color.

Figure 25:
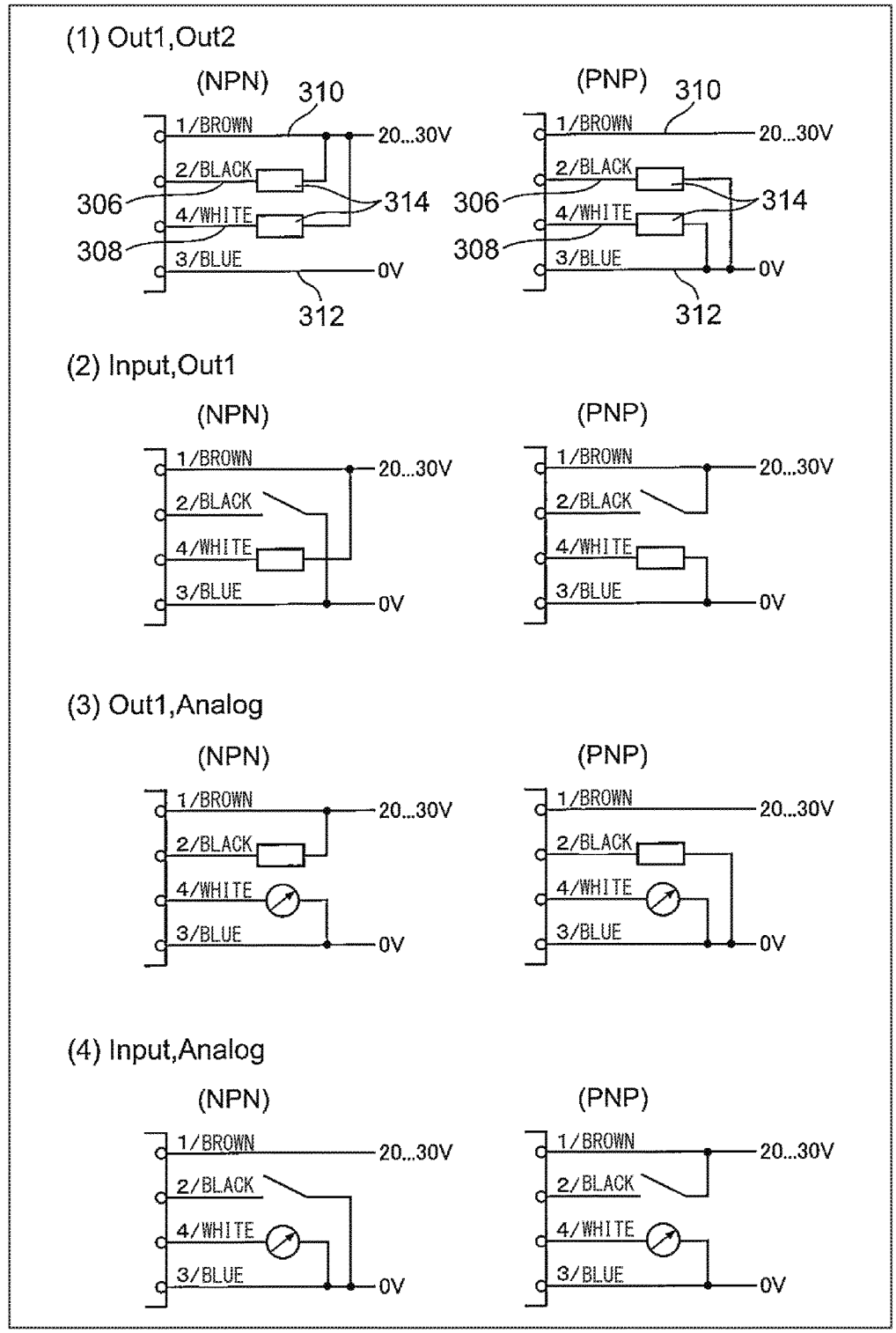
FIG. 25 is a view for explaining eight input/output forms that can be set by connection of input/output lines of the photoelectric sensor of the embodiment.

Referring to FIG. 25, in the photoelectric sensor 300 of the embodiment, one form can be selected out of eight input/output forms by changing a method for connecting first and second input/output lines 306 (black line) and 308 (white line) included in the input cable 304. Reference numeral 310 in FIG. 25 denotes a power supply line (brown), and reference numeral 312 denotes an earth line (blue). Further, reference numeral 314 denotes an input load.

Still referring to FIG. 25, in (1) "Out1+Out2", the black line 306 can be allocated to an output 1, and the white line 308 can be allocated to an output 2. In (2) "Input+Out1", the black line 306 can be allocated to an external input, and the white line 308 can be allocated to the output 1. In (3) "Out1+Analog", the black line 306 can be allocated to the output 1, and the white line 308 can be allocated to an analog output. In (4) "Input+Analog", the black line 306 can be allocated to the external input, and the white line 308 can be allocated to the analog output.

Initial Setting (FIGS. 26, 27):

When the user first turns on power or executes initialization after obtaining the photoelectric sensor 300, a screen requesting an initial setting is displayed on the display section 100. The initial setting will be described with reference to FIG. 26. First, a screen for selecting an input/output is displayed on the display section 100 (S1). An input/output form corresponding to wiring of the input/output described with reference to FIG. 25 is selected in this Step S1.

Specifically, when the SET button 120A is short-pressed (pressed for a short time of one second or less), a list of "Out1+Out2", "Input+Out1", "Out1+Analog" and "Input+Analog" is displayed on the display section 100 in a vertically arrayed manner. The user can select the corresponding input/output form by pressing the up-button 120B or the down-button 120C. When a desired input/output form is selected, the input/output form is set by short-pressing the SET button 120A, and the set input/output form is displayed on the display section 100 in letters (e.g., "Out1+Out2"). With this setting, allocation to the black line 306 and the white line 308 is executed as described with reference to FIG. 25.

Figure 26:
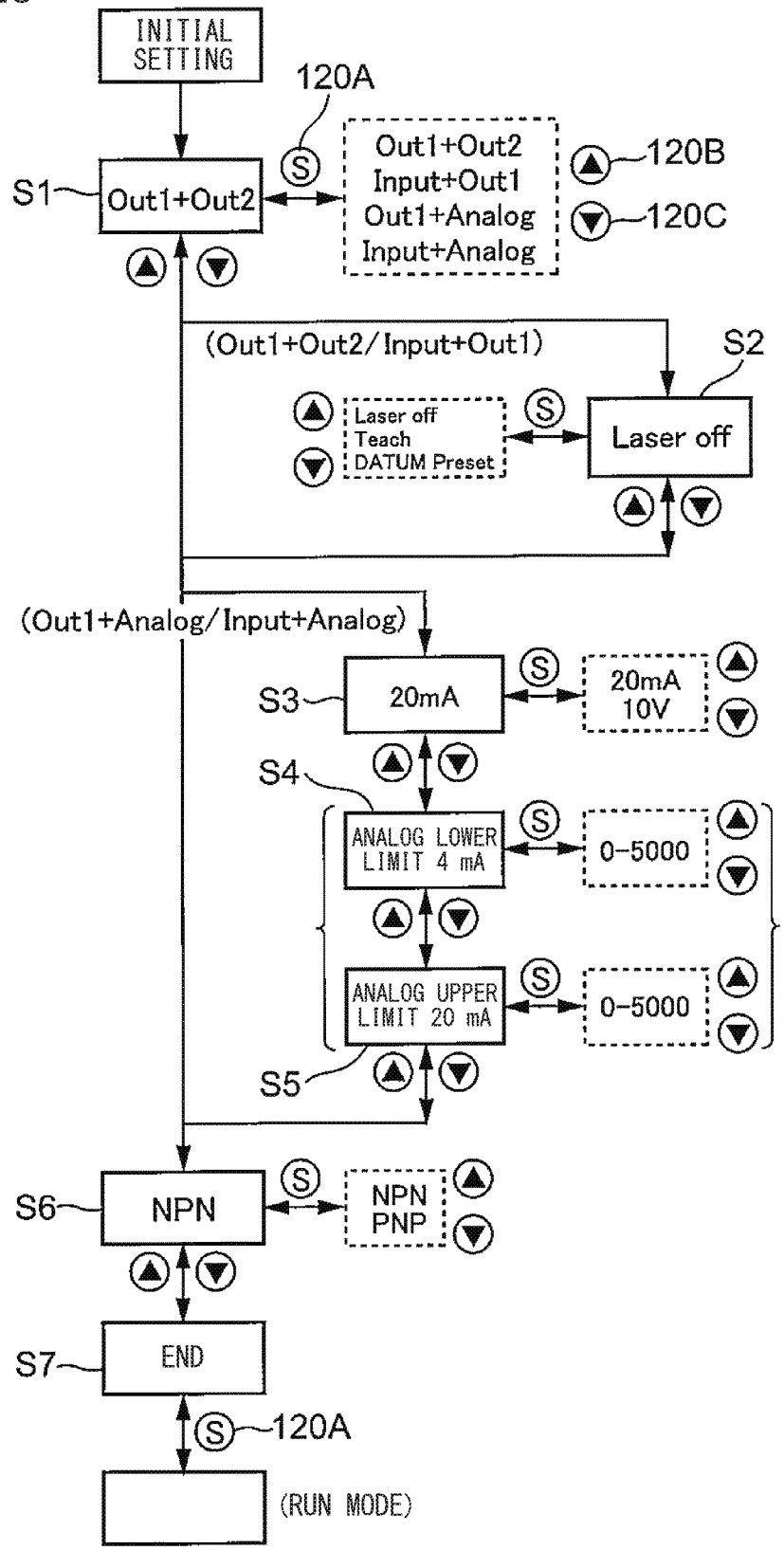
FIG. 26 is a view for explaining a button operation required for shifting and setting of an initial setting screen of the photoelectric sensor of the embodiment.

When the down-button 120C is pressed, switching is made to the next screen. In FIG. 26, S2 shows a screen in a case where the input/output form of "Out1+Out2" or "Input+Out1" has been set. S3 shows a screen in a case where the input/output form of "Out1+Analog" or "Input+Analog" has been set.

In FIG. 26, the input can be selected by means of the screen shown in S2. On the other hand, whether an analog input is a current or a voltage can be set by means of the screen shown in S3. S4 and S5 subsequent to S3 may be performed in a later-described detail setting, but in this embodiment, they are included in the initial setting.

Figure 27:
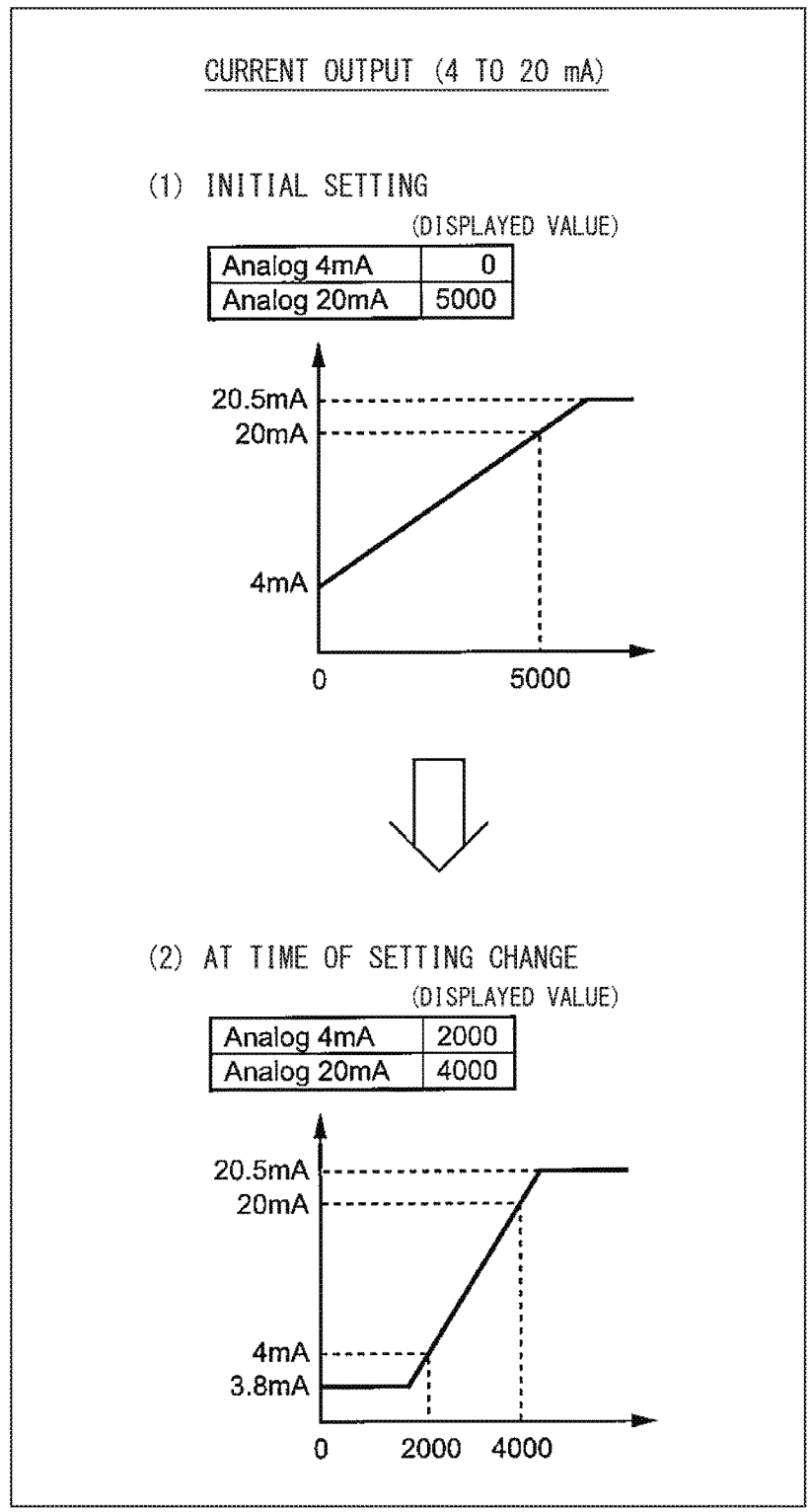
FIG. 27 is a view for explaining setting of an analog upper limit and/or an analog lower limit.

An analog lower limit can be set by means of a screen in Step S4. On the other hand, an analog upper limit can be set by means of a screen in Step S5. When the numerical value displayed in S4 or S5 is to be changed, the SET button 120A is short-pressed (pressed for one second or less), and the up-button 120B or the down-button 120C is then pressed, to thereby change the displayed numerical value. When a desired numerical value is obtained, the SET button 120A is pressed, to set the numerical value. FIG. 27 is a view for explaining setting of the analog upper limit and the analog lower limit. FIG. 27 shows an example where, when an initial set value is "0" (lower limit) with respect to 4 mA and "5000" (upper limit) with respect to 20 mA, the user manually sets "2000" (lower limit) with respect to 4 mA and "4000" (upper limit) with respect to 20 mA.

When the setting of the upper limit and the lower limit is completed, the down-button 120C is pressed, to thereby make switching to the next screen of S6. Using this screen of S6, NPN or PNP can be set.

After completion of a variety of setting by means of the above setting screens of S1 to S6, the down-button 120C is pressed, to display an end screen of S7. Note that, the up-button 120B may be pressed to return to the setting screens of S1 to S6. When the end screen of S7 is on display, the SET button 120A is short-pressed, to thereby switch the operation of the photoelectric sensor 300 to the Run mode.

Detection Mode (FIGS. 28 to 33):

As the Run mode (detection mode), the photoelectric sensor 300 includes a "DATUM mode", a "distance mode", and a "window mode". The detection mode can be selected and set in the later-described detail setting mode by switching the operation of the photoelectric sensor to the detail setting mode.

DATUM Mode (FIG. 28):

The DATUM mode is set by selecting "Standard" out of options for the detection mode of the photoelectric sensor 300 in the later-described detail setting mode.

(1) Operation at the Time of Run:

In the DATUM mode, with an arbitrary background, namely, a reference plane, taken as "0", a height from this reference plane is displayed on the display section 100. Then, an output is reversed between a first threshold (A) on the near side and a second threshold (−A) on the far side with the reference plane placed therebetween.

Figure 28:
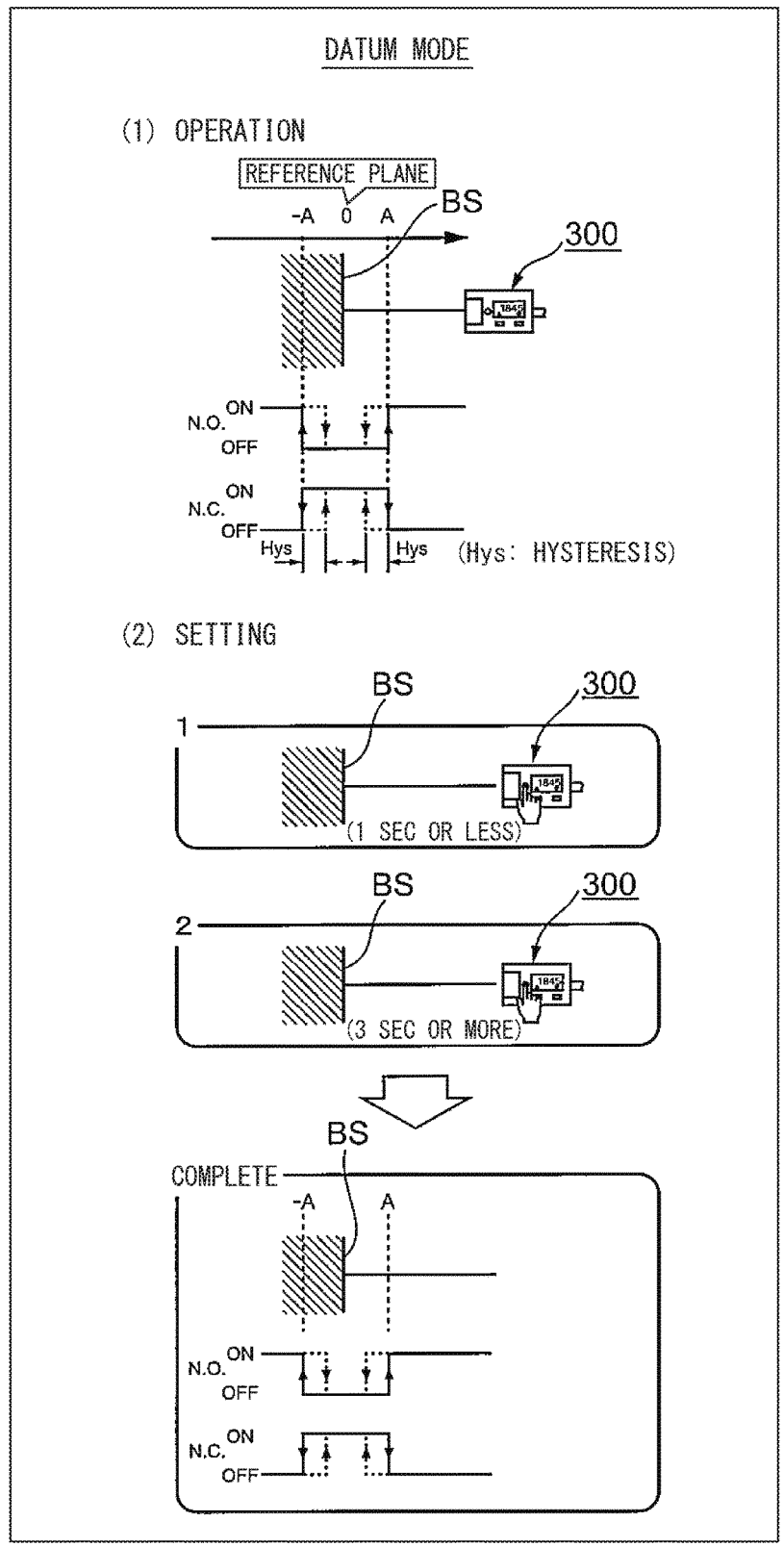
FIG. 28 is a view for explaining an operation and a threshold setting method in a DATUM mode included in detection modes.

"N. O." illustrated in FIG. 28 represents normal open. An OFF signal is outputted when a workpiece is located between the first and second thresholds, and an ON signal is outputted when the workpiece is located in a nearer position than the first threshold (A) and in a farther position than the second threshold (−A).

"N. C." illustrated in FIG. 28 represents normal close. The ON signal is outputted when the workpiece is located between the first and second thresholds, and the OFF signal is outputted when the workpiece is located in a nearer position than the first threshold (A) and in a farther position than the second threshold (−A).

(2) Setting:

Still referring to FIG. 28, after positioning the reference plane BS, the SET button 120A is first short-pressed and then long-pressed, to thereby set the first and second thresholds (A, −A) with this reference plane BS placed therebetween. An automatically set value of the distance "A" from the reference plane BS can be changed in the later-described detail setting. Further, a value of hysteresis (Hys) can also be changed in the detail setting.

Setting of the DATUM mode is completed by the user simply long-pressing the SET button 120A. Naturally, immediately after completion of this setting, the photoelectric sensor 300 is returned to the Run mode, and is operated in the DATUM mode.

Distance Mode (FIGS. 29 to 31):

The distance mode can be set by selecting "Distance" out of the options for the detection mode of the photoelectric sensor 300 in the later-described detail setting mode.

Figure 29:
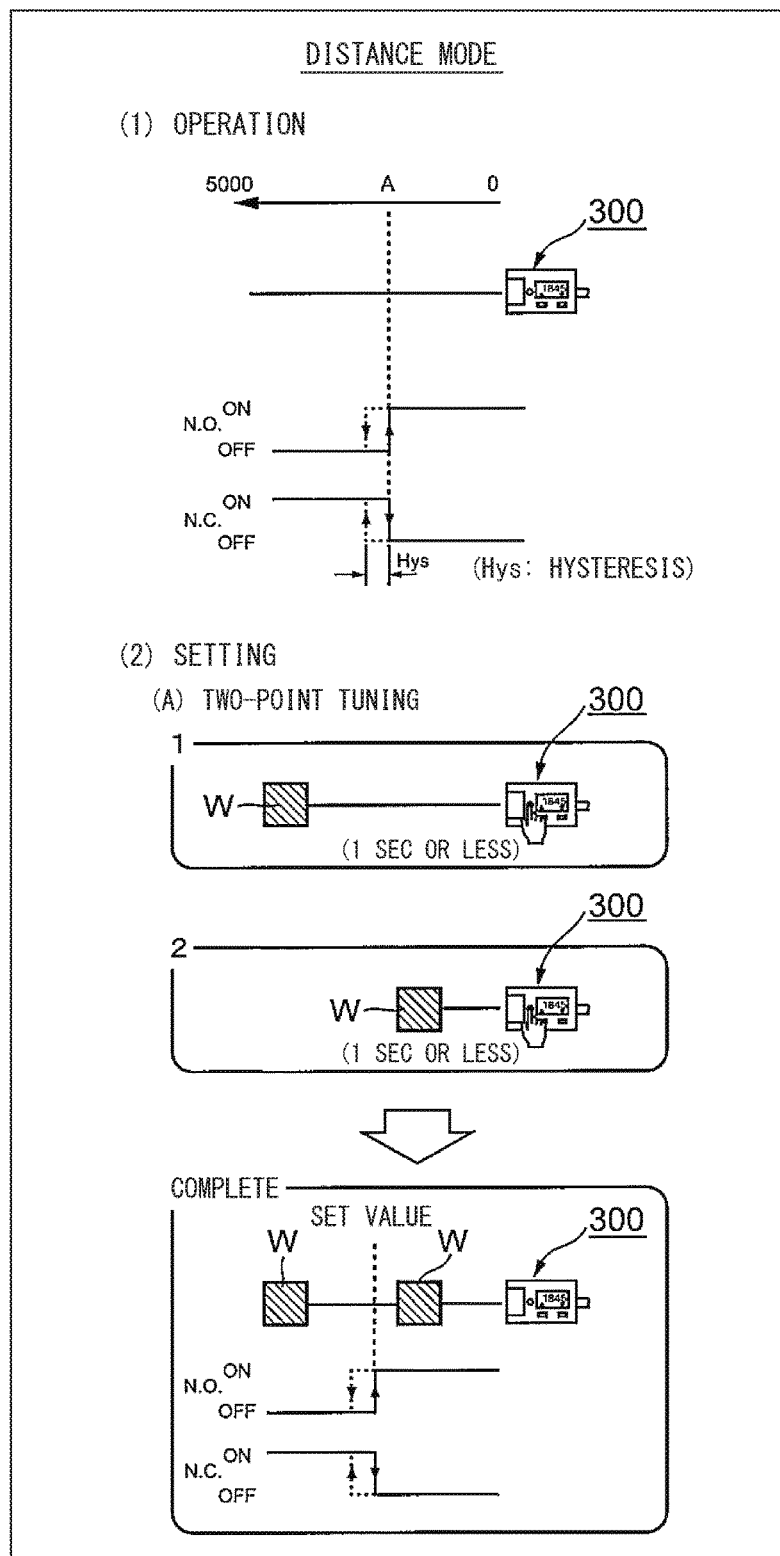
FIG. 29 is a view for explaining an operation and a threshold setting method (two-point tuning) in a distance mode included in the detection modes.

(1) Operation at the Time of Run (FIG. 29):

Referring to FIG. 29, in the distance mode, a distance from the photoelectric sensor 300 to the workpiece is detected, and this detected distance is displayed on the display section 100. Then, in comparison with the threshold (A), in the case of normal open (N. O.), an OFF signal is outputted when the workpiece is located in a farther position than the threshold (A), and an ON signal is outputted when the workpiece is located in a nearer position than the threshold (A). In contrast, in the case of normal close (N. C.), an ON signal is outputted when the workpiece is located in a farther position than the threshold (A), and an OFF signal is outputted when the workpiece is located in a nearer position than the threshold (A).

(2) Setting:

Three kinds of threshold setting methods are prepared in the distance mode: (A) two-point tuning method; (B) full-auto tuning method; and (C) one-point tuning method.

(A) Two-Point Tuning Method:

Referring to FIG. 29, after positioning a workpiece W in a far position, the SET button 120A is short-pressed. Next, after positioning the workpiece W in a near position, the SET button 120A is short-pressed. A threshold is thus set between the far position and the near position.

(B) Full-Auto Tuning Method (FIG. 30):

The full-auto tuning method is effectively applicable to the case of not being able to fix the object to be detected, namely, the workpiece W, for example, the case of not being able to fix the workpiece W such as the workpiece W being carried by a conveyor.

Figure 30:
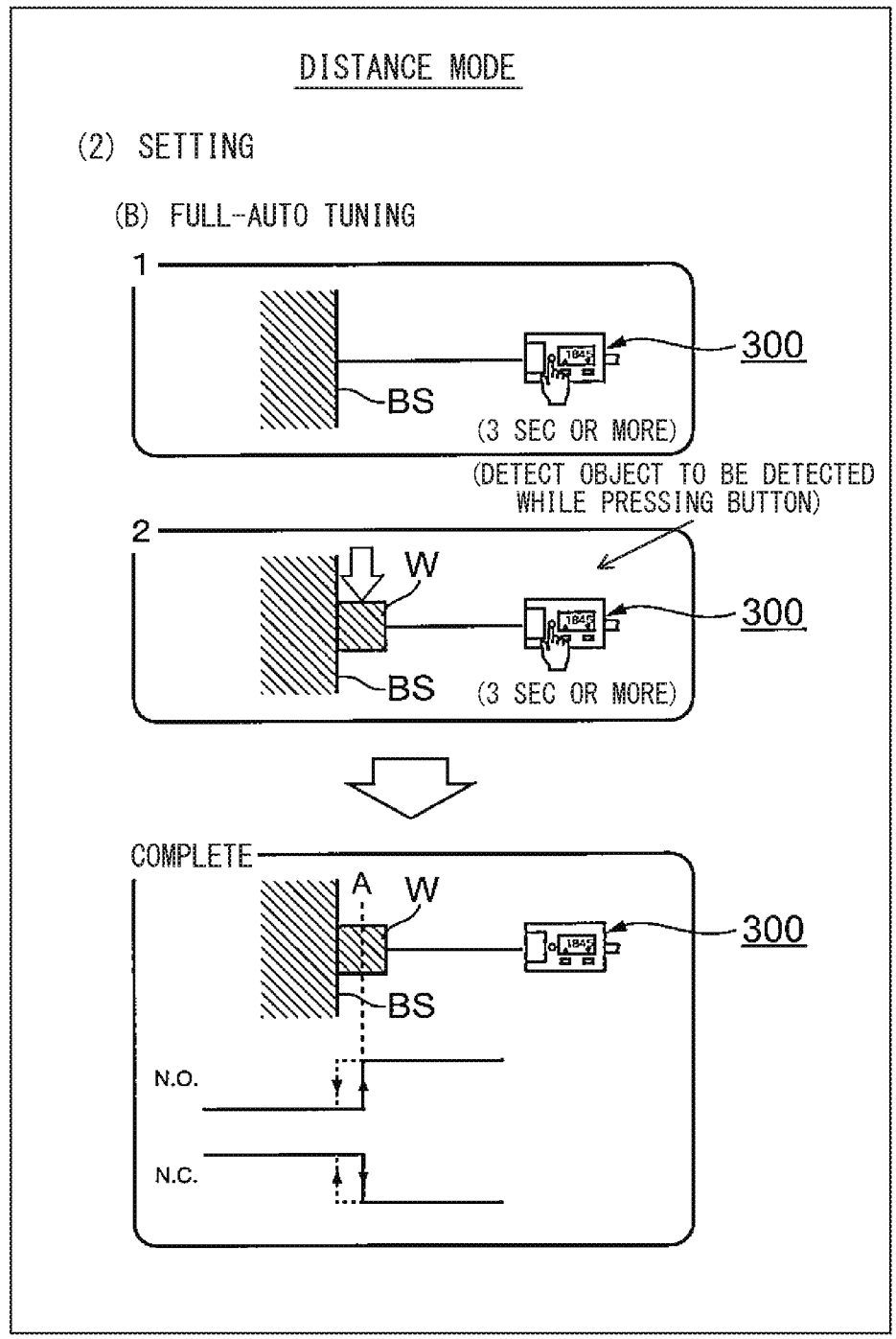
FIG. 30 is a view for explaining another threshold setting method (full-auto tuning) in the distance mode.

Referring to FIG. 30, first, the SET button 120A is long-pressed in a state without the workpiece W (reference plane BS). Next, the workpiece W is detected in the state of this SET button 120A being continuously pressed. Accordingly, a threshold A is set between the reference plane BS and a height of the workpiece W.

(C) One-Point Tuning Method (FIG. 31):

The one-point tuning method is effectively applicable to the case of being able to fix the object to be detected, namely, the workpiece W, at the upper limit (far position).

Figure 31:
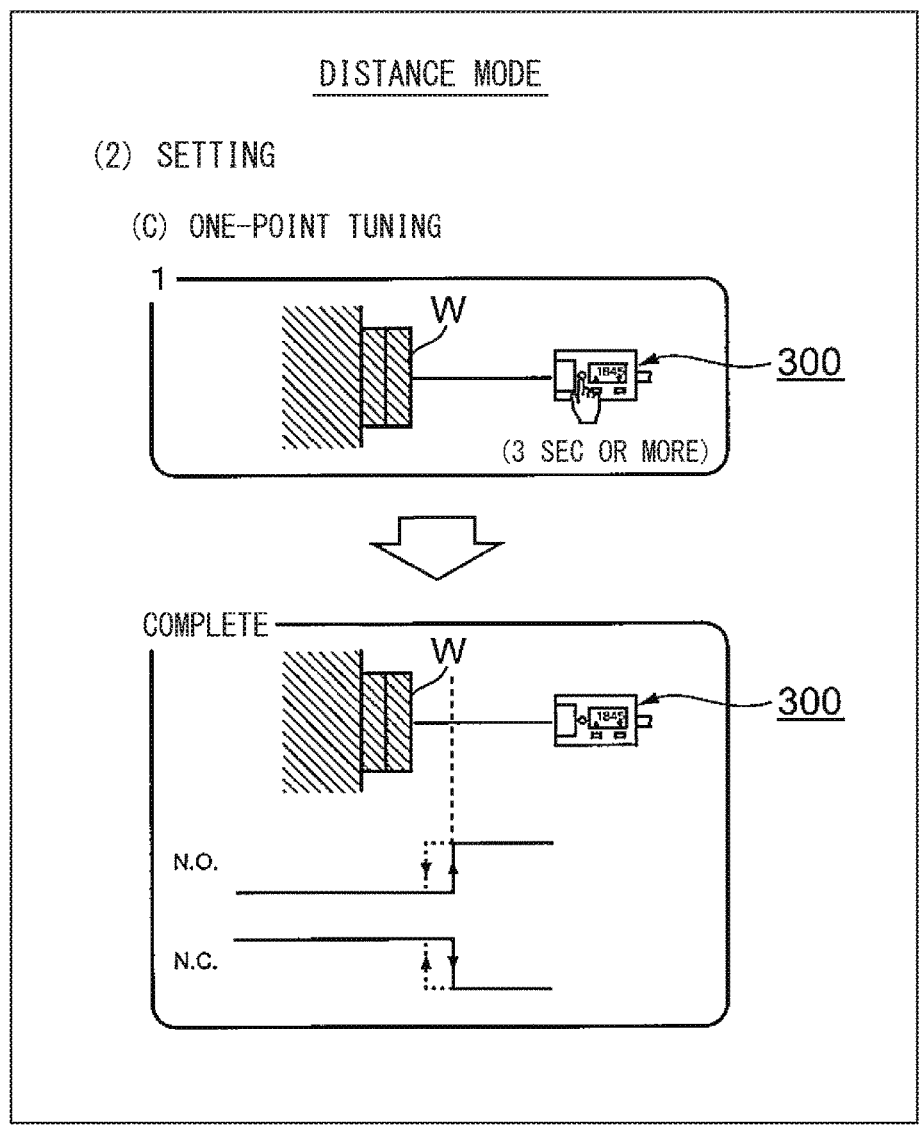
FIG. 31 is a view for explaining another threshold setting method (one-point tuning) in the distance mode.

Referring to FIG. 31, after positioning of the workpiece W, the SET button 120A is long-pressed. Accordingly, the threshold (A) is set in a nearer position than the workpiece W by a predetermined distance. This predetermined distance, namely, a margin, can be set in the later-described detail setting.

Window Mode (FIGS. 32, 33):

The window mode can be set by selecting "Window" out of the options for the detection mode of the photoelectric sensor 300 in the later-described detail setting mode.

Figure 32:
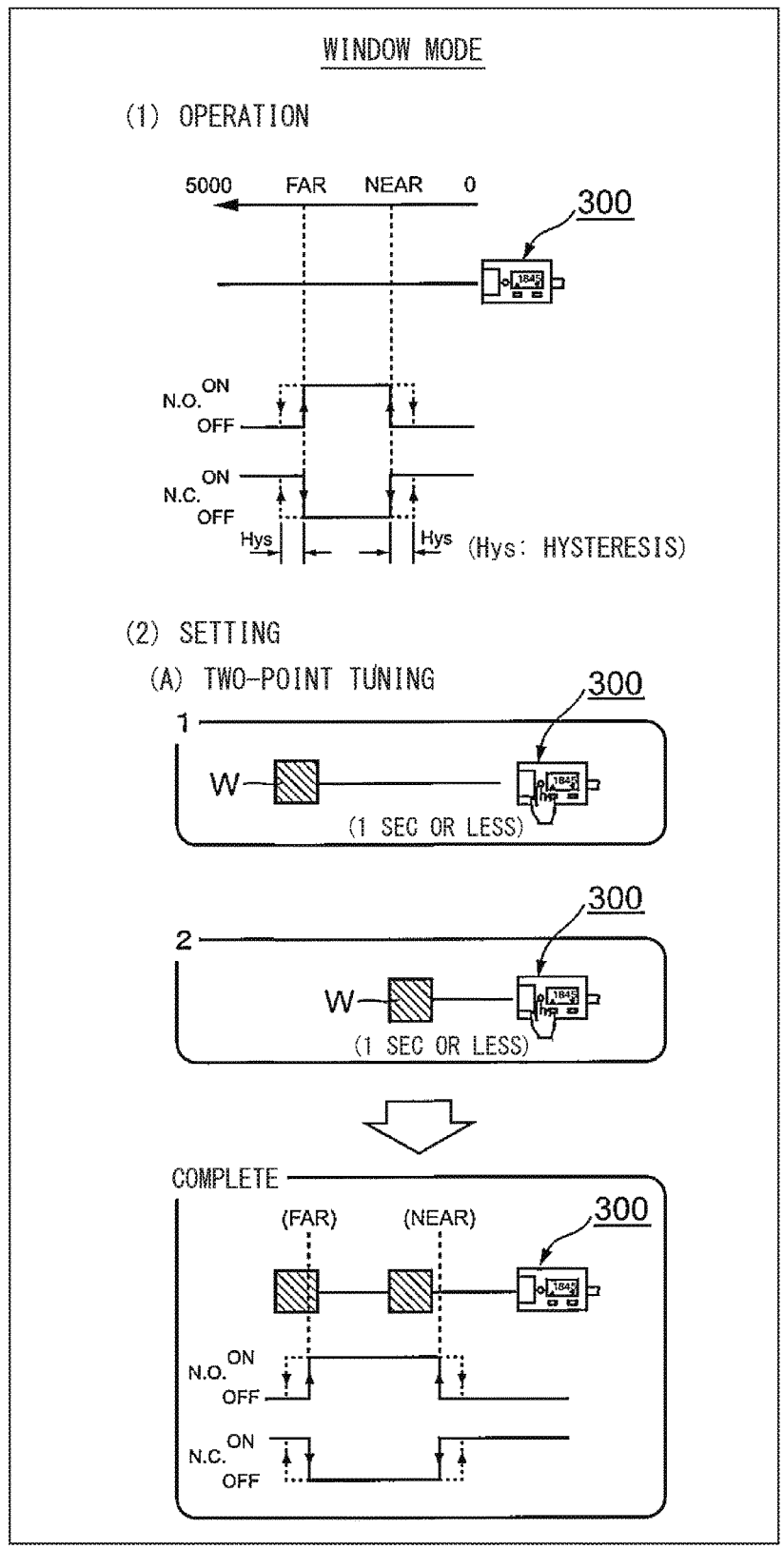
FIG. 32 is a view for explaining an operation and a threshold setting method (two-point tuning) in a window mode included in the detection modes.

(1) Operation at the Time of Run:

Referring to FIG. 32, a distance from the photoelectric sensor 300 is displayed on the display section 100. Then, an output is reversed between the set far-positioned threshold (Far) and the set near-positioned threshold (Near).

Figure 33:
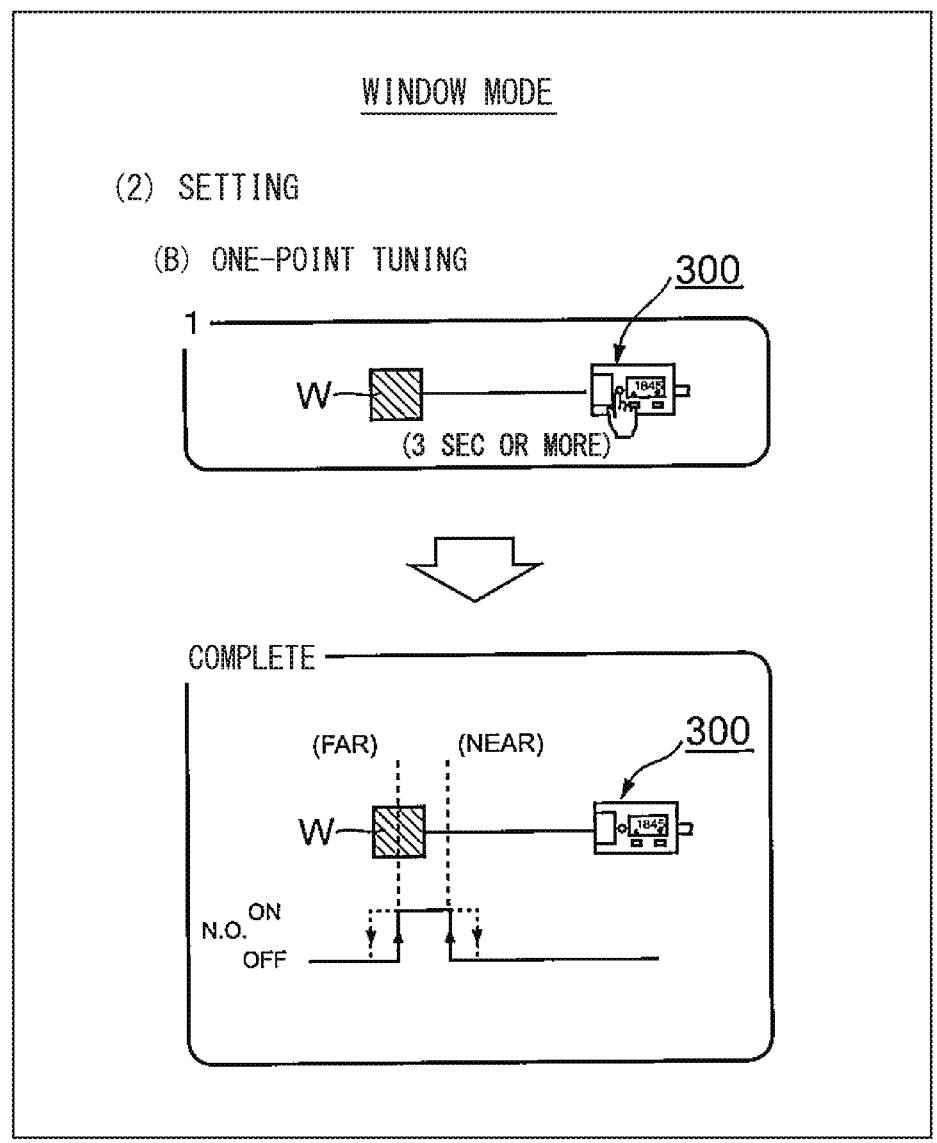
FIG. 33 is a view for explaining another threshold setting method (one-point tuning) in the window mode.

(2) Setting:

Two kinds of threshold setting methods are prepared in the window mode: (A) two-point tuning method (FIG. 32); and (B) one-point tuning method (FIG. 33).

(A) Two-Point Tuning Method (FIG. 32):

Referring to FIG. 32, after positioning the workpiece W in a far position, the SET button 120A is short-pressed. Next, after positioning the workpiece W in a near position, the SET button 120A is short-pressed. Accordingly, a far-positioned threshold (Far) and a near-positioned threshold (Near) are set.

(B) One-Point Tuning Method (FIG. 33):

Referring to FIG. 33, after positioning the workpiece W in a far position, the SET button 120A is short-pressed. Accordingly, a far-positioned threshold (Far) is set, and a near-positioned threshold (Near) which away from this far-positioned threshold (Far) by a predetermined distance is set. When a value of this predetermined distance is to be changed, it can be changed in the later-described detail setting.

Setting of Display Form at the Time of Run (FIG. 34):

The display form of the display section 100 at the time of Run can be set even during Run of the photoelectric sensor 300. When the photoelectric sensor 300 is in the Run mode, a display form change mode can be started by long-pressing the up-button 120B.

Figure 34:
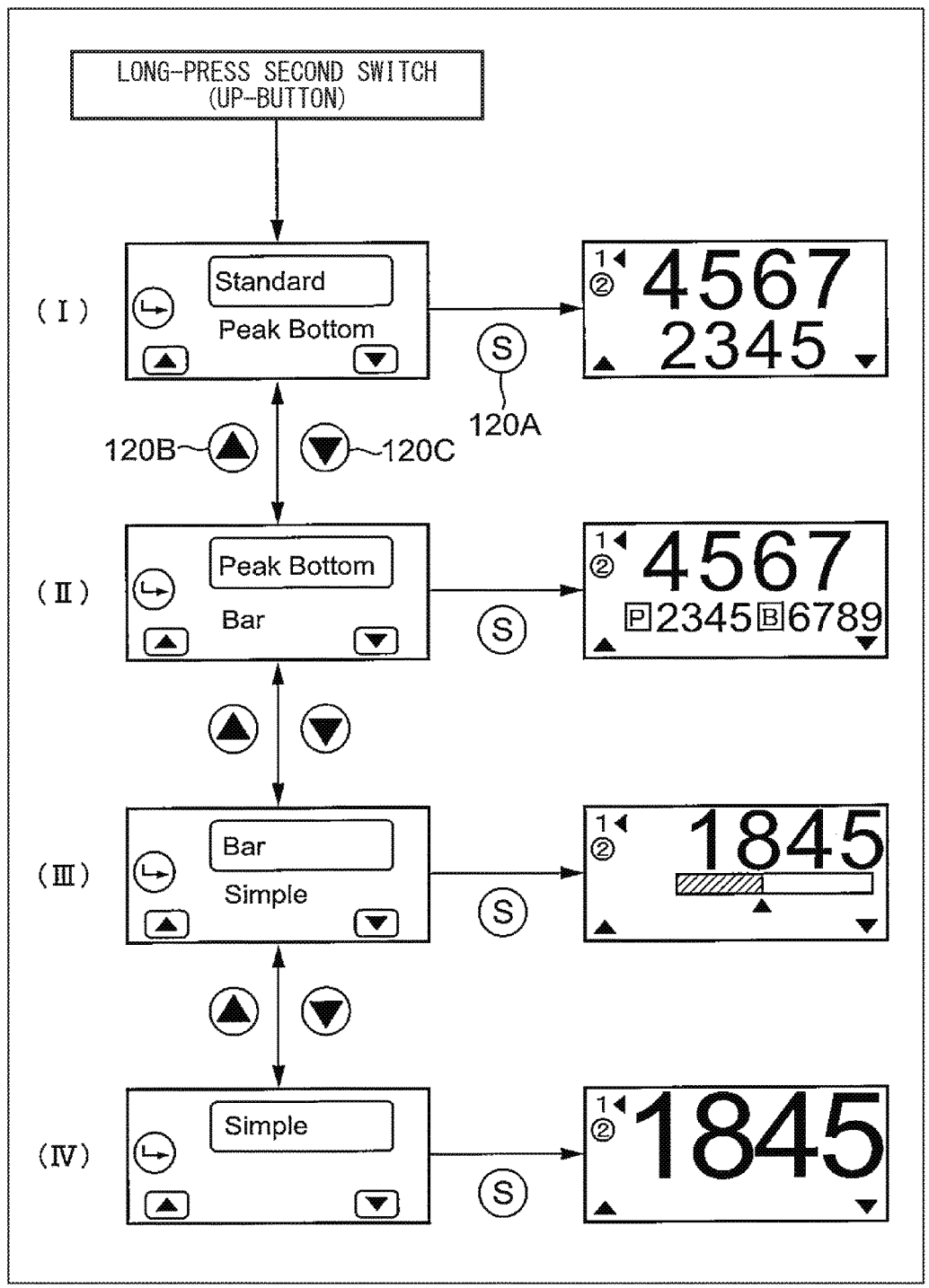
FIG. 34 is a view for explaining setting methods for display forms of the display section in a Run mode and a screen configuration in each display form.

Referring to FIG. 34, when the display form change mode is started, items included in a selection menu are displayed vertically in two letter strings on the display section 100. There are four of these selectable letter strings: (1) Standard; (2) Peak Bottom; (3) Bar; and (4) Simple, and each of the letter strings clearly indicates an outline of the display form. An intended item can be selected from these items by short-pressing the up-button 120B or the down-button 120C. Next, this selected display form can be set by short-pressing the SET button 120A. Hence it is possible to switch the display form by a simple operation during Run.

A portion (I) of FIG. 34 shows an example where the "Standard" display form has been set. This display example is a case where there is one threshold, and when there are two thresholds, a first threshold and a second threshold are laterally displayed. As seen from the portion (I) of FIG. 34, in a screen configuration of the "Standard" display form, a current value "4567" is displayed in large-sized numerals, and therebelow, a threshold, namely, a set value "2345" is displayed in relatively small-sized numerals. Naturally, the current value and the set value may be displayed in the same color, but they may be displayed in different colors.

A portion (II) of FIG. 34 shows an example where the "Peak Bottom" display form has been set. As seen from the portion (II) of FIG. 34, in a screen configuration of the "Peak Bottom" display form, a current value "4567" is displayed in large-sized numerals, and therebelow, a peak value "2345" and a bottom value "6789" are laterally displayed in relatively small-sized numerals. The peak value and the bottom value may be displayed in the same color, but they may be displayed in different colors. "P" shown on the left of the peak value "2345" indicates that the numerical value "2345" is a peak value. "B" shown on the left of the bottom value "6789" indicates that the numerical value "6789" is a bottom value.

A portion (III) of FIG. 34 shows an example where the "Bar" display form has been set. As seen from the portion (III) of FIG. 34, in a screen configuration of the "Bar" display form, a current value "1845" is displayed in large-sized numerals, and therebelow, a bar extending in a lateral direction is displayed. This bar indicates which position between the upper limit and the lower limit the workpiece W is located. Note that, in the photoelectric sensor that displays a magnitude of a light reception amount, a margin of a light reception amount can be displayed using this bar.

A portion (IV) of FIG. 34 shows an example where the "Simple" display form has been set. As seen from the portion (IV) of FIG. 34, in a screen configuration of the "Simple" display form, a current value "1845" is displayed in large-sized numerals covering the majority of the display section 100. In the display examples of the portions (I) to (IV) of FIG. 34, "1" and "2" are displayed in a vertically arrayed manner on the upper left of the display section 100.

These "1" and "2" indicate whether numerical value information displayed on an output channel of the photoelectric sensor 300, namely, the display section 100 of the photoelectric sensor 300, is a numerical value related to a first channel (ch. 1) or a numerical value related to a second channel (ch. 2). A display method which can be easily recognized by the user is preferably adopted, such as a bright display or flickering of the channel number on display.

Referring to the portions (I) to (IV) of FIG. 34, as seen from the examples of the display form switchable during Run, each display form has an output channel, a set value, a bottom value, or a peak value, other than a current value. Besides these, as described later, the display form during Run can include a hold value, a margin, or first and second set values in the case of there being two set values.

As described above with reference to FIG. 34, the display form change mode can be started during Run by long-pressing the up-button 120B, and in this display form change mode, a menu guide by means of letter information such as "Standard" or "Peak Bottom" is displayed on the display section 100, thereby facilitating the user to select the desired display mode. Further, a screen of the selected display form is displayed on the display section 100 by pressing the SET button 120A, to thereby facilitate checking thereof. Moreover, as for numerical value information other than a current value displayed on the display section 100, since characters clearly indicating a direct meaning of the displayed numerical value are displayed in a position adjacent to the numerical value, it is possible to immediately recognize the numerical value displayed on a screen called to the display section 100. Hence, it is possible to tell whether each of numerical values, which are displayed on the display section 100 one after another during switching of the display form in this display form change mode, is a set value, a hold value, a peak value, or the like, so as to prevent misunderstanding of a meaning of each numerical value.

Figure 35:
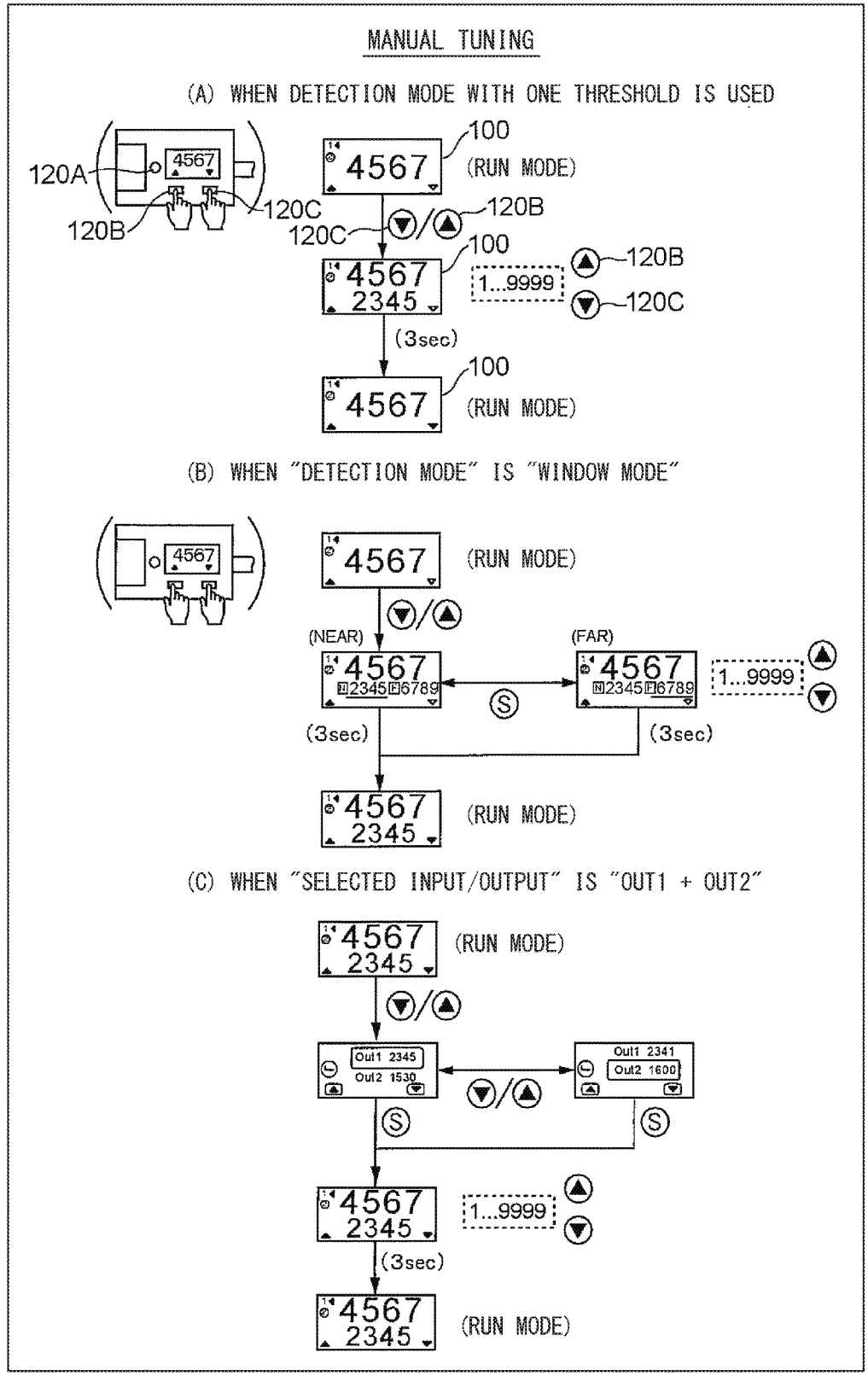
FIGS. 35A to 35C are views for explaining an operation in manual tuning that allows direct adjustment and resetting of a threshold during operation of the photoelectric sensor of the embodiment in the Run mode.

Adjustment and Setting of Threshold at the Time of Run (FIG. 35):

When adjustment of a threshold, namely, resetting, is required during operation of the photoelectric sensor 300 in the Run mode, the threshold can be directly adjusted in this Run mode (manual tuning) (FIG. 35).

(A) When Detection Mode with One Threshold is Used:

Referring to FIG. 35A, when the up-button 120B or the down-button 120C is short-pressed during operation in the Run mode, the display section 100 becomes a tuning display form in which a current value "4567" is displayed in large-sized numerals in an upper portion and a set value "2345" is displayed below the current value "4567". As a modified example, the "set value" may be displayed in a main portion of the display section 100, and the "current value may be displayed in a position not interfering with this set value, for example, in a side section or a lower portion of the display section 100.

When the up-button 120B is pressed, the numerical value of the set value displayed on the display section 100 becomes larger in size. Further, when the down-button 120C is pressed, the numerical value of the set value becomes smaller in size. When the numerical value displayed on the display section 100 changes, the photoelectric sensor 300 is operated based on this changed numerical value. When the numerical value becomes a desired value, the photoelectric sensor 300 is left untouched, whereby, three seconds later, this numerical value after the adjustment is set and the photoelectric sensor 300 is operated based on the newly set threshold. The display of the photoelectric sensor 300 is returned to the Run mode.

Referring to FIG. 35A illustrated at the top, the display form that displays the current value by using almost the entire region of the display section 100 is adopted to the display section 100 at the time of normal operation of the photoelectric sensor 300 in the Run mode. On a tuning screen illustrated therebelow, the current value is displayed in an upper portion and the threshold is displayed below the current value. That is, the screen configuration in the Run mode and the screen configuration in multi-tuning are different, and the display form that simultaneously displays the current value and the threshold is adopted to the threshold setting screen. On the threshold setting screen, the numerical value of the current value and the numerical value of the threshold may be displayed in the same size, or the threshold may be displayed at the center of the display section 100 while the current value may be displayed in a position not interfering with the display of the threshold. Further, one of the set value and the current value displayed on the display section 100 may be displayed in relatively large-sized numerals, and the other may be displayed in small-sized numerals.

Moreover, the current value is displayed in the upper portion and the threshold is displayed in the lower portion in the illustrated example, but alternatively, the threshold may be displayed in the upper portion and the current value may be displayed in the lower portion.

As still another modified example, as described above, there may be adopted a display form such as the display form described above with reference to FIG. 2 in which a threshold is displayed in a main portion of the display section 100, and a current value is displayed in relatively small-sized numerals in a position not interfering with the display of the threshold, such as the left corner of the display section 100.

Naturally, a display color of the current value and a display color of the threshold may be the same, but the current value and the threshold may be displayed in different colors. Further, the threshold may be made to flicker when the screen of the display section 100 is switched to the display of manual tuning, and this flickering may be ended when the threshold is adjusted and its setting is completed. As a modified example, a display color of the threshold during adjustment may be made different from a display color of the threshold after completion of its setting. Further, the up/down-characters 122 (FIG. 24) may be made to flicker before completion of setting of the threshold. Moreover, upon completion of setting of the threshold, the display of the up/down-characters 122 may be made to disappear.

(B) When Detection Mode is "Window Mode":

Referring to FIG. 35B, when the up-button 120B or the down-button 120C is short-pressed during operation in the Run mode, the display section 100 becomes a display form in which a current value "4567" is displayed in large-sized numerals in an upper portion, and a first set value "2345" and a second set value "6789" are laterally displayed below the current value "4567". Next, when the SET button 120A is pressed, the first or second set value can be selected. Then, when the up-button 120B or the down-button 120C is pressed, the numerical value of the selected threshold (set value) is changed. When the numerical value displayed on the display section 100 changes, the photoelectric sensor 300 is operated based on this changed numerical value. When the first and second thresholds become desired numerical values, the photoelectric sensor 300 is left untouched, whereby, three seconds later, the numerical values after the adjustment are set. The numerical value may be made to flicker before completion of adjustment of the threshold and its setting, or the numerical value before the setting may be made different from the numerical value after the setting. After completion of this setting, the photoelectric sensor 300 is operated based on the newly set threshold.

Similarly to FIG. 35A described above, also in the display example of FIG. 35B, there has been adopted the display form in which the current value is displayed in almost the entire region of the display section 100 at the time of normal operation in the Run mode. Then, on the tuning screen, there has been set the display form in which the first and second thresholds are laterally displayed below the current value. Also in this case, needless to say, the display method described in FIG. 35A may be adopted for the display of the threshold selected out of the first and second thresholds.

The foregoing display forms of FIGS. 5 to 7 may be adopted for the displays of the first and second thresholds. As still another modified example, there may be adopted the display form described with reference to FIG. 3 in which the first and second thresholds are displayed in the respective first and second regions in a vertically arrayed manner and the current value is displayed in relatively small-sized numerals at the left corner of the display section 100.

(C) When Input/Output "Out1+Out2" has Been Set:

Referring to FIG. 35C, at the time of normal operation of the photoelectric sensor 300 in the Run mode, when the up-button 120B or the down-button 120C is short-pressed, the letters "Out1" and a threshold (set value) of the output 1 and the letters "Out2" and a threshold (set value) of the output 2 are vertically displayed on the display section 100. By short-pressing the up-button 120B and the down-button 120C, "Out1" or "Out2" can be selected.

Then, when the SET button 120A is short-pressed, the display section 100 becomes a display form in which the current value and the threshold of the selected "Out1" or "Out2" are vertically displayed. In this display form, a numerical value of the current value is displayed in large-sized numerals, and below the current value, a numerical value of the threshold (set value) is displayed in small-sized numerals. Then, when the up-button 120B or the down-button 120C is pressed, the numerical value of the selected threshold (set value) is changed. When the numerical value displayed on the display section 100 changes, the photoelectric sensor 300 is operated based on this changed numerical value. When the numerical value becomes a desired value, the photoelectric sensor 300 is left untouched, whereby, three seconds later, this numerical value after the adjustment is set and the photoelectric sensor 300 is operated based on the newly set threshold. Naturally, the display of the photoelectric sensor 300 is returned to the Run mode.

Needless to say, as to the display of the threshold, the display method described in FIG. 35A may also be adopted to the case of FIG. 35C.

Detail Setting:

By long-pressing the third button 120C, the operation of the photoelectric sensor can be switched from the Run mode to the detail setting mode. An illustrative list of items in a menu settable (selectable) by use of the detail setting mode includes: (1) response time; (2) an output logic of each output; (3) a detection mode of each output; (4) timer time for each output; (5) hysteresis; (6) received light sensitivity; (7) an analog lower limit; (8) an analog upper limit; (9) setting of an output hold or cancel of setting; and (10) brightness of the display section 100.

Each setting item is shifted by pressing the up-button 120B or the down-button 120C. When a desired setting item is displayed on the display section 100, the settable menu is displayed on the display section 100 by short-pressing the SET button 120A, and the item can be selected from the settable menu by use of the up-button 120B or the down-button 120C. Further, in the case of an item for resetting a numerical value such as hysteresis, a numerical value can be reset to a desired value by use of the up-button 120B or the down-button 120C.

This detail setting mode is ended by short-pressing the SET button 120A in a state where letters "Detail Setting End" are displayed on the display section 100, and the photoelectric sensor 300 is returned to the Run mode.

Although the display form of the rectangular display section 100 of the distance setting photoelectric sensor 300 has been described above, it is substantially the same in the case of the narrow display section 200 of the slim-type. Further, the same applies to the display of the photoelectric sensor that detects the presence or absence of the workpiece W based on a magnitude of a light reception amount.

An illustrative list of information to be displayed on the display section in the photoelectric sensor in a broad general sense is as follows:

(1) Output: ON/OFF, an analog current value or an analog voltage value, a channel number, an L-on/D-on setting state;

(2) Current value: a distance, a light reception amount, a coincidence, a margin, a channel number, a current value after preset, a current value after shift;

(3) Hold: a peak value, a bottom value;

(4) Set value: a threshold, a channel number, a lower limit, an upper limit, first and second thresholds in a window;

(5) State of the photoelectric sensor: presence or absence of a key lock, abnormal states such as an error and a warning, ON/OFF states of an external input, an operating state of an external input function, a preset state, an APC state, a communication state with host equipment, a communication state with coupling extension, a set detection mode; and (6) Others: vertical inversion of a display of the display section, horizontal/vertical writing, a tag display, switching of a displayed language, a form of the photoelectric sensor, a serial number.

Out of the above display information, displays that make time-series changes are ON/OFF of an output, a current value, and an external input.

Examples of the display methods for the display sections 100, 200 in the case of displaying a numerical value include: displaying the numerals by means of some size, some color, shading, flickering, a bar display, and a waveform display of time-series information.

Examples of the display forms of the display sections 100, 200 at the time of normal operation of the box-type or the slim-type photoelectric sensor in the Run mode include the following combinations other than a display of only a current value and a simultaneous display of a current value and a threshold (set value):

(1) Simultaneous display of a current value and a hold value;

(2) Simultaneous display of a current value, a hold value, and an output state;

(3) Simultaneous display of a current value, a threshold, and an output state;

(4) Simultaneous display of a current value and a margin;

(5) Simultaneous display of a current value, a margin, and an output state;

(6) Simultaneous display of a current value and bar display;

(7) Simultaneous display of a current value, a bar display, and an output state;

(8) Simultaneous display of a current value of a first channel and a current value of a second channel; and (9) Simultaneous display of a current value of a first channel, a current value of a second channel, and an output state.

Figure 36:
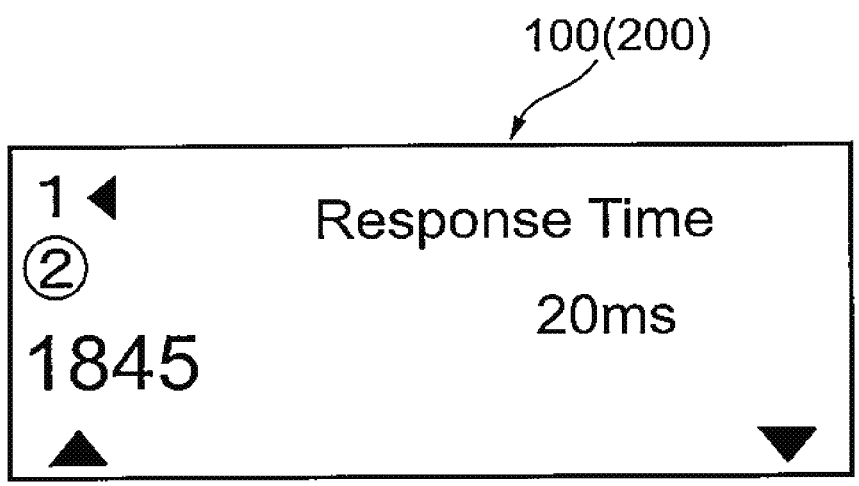
FIG. 36 is a view for explaining an example where a numerical value of a current value is displayed in small-sized numerals at the corner of the display section when the display of the display section is switched to a letter display, in the case of the current value being displayed in large-sized numerals on the display section in the Run mode.

Further, in the case where a current value is displayed in large-sized numerals on the display section 100 or 200 in the Run mode, the display form illustrated in FIG. 36 is preferably adopted when the display of the display section 100 or 200 is switched to a letter display such as "Warning" or when letter information is displayed in the detail setting mode. FIG. 36 illustrates the rectangular display section 100, but the display form is substantially the same even in the case of the narrow display section 200. Referring to FIG. 36, letter information, as well as a numerical value related thereto if necessary, is displayed in a main region of the display section 100, and a current value "1845" is displayed in relatively small-sized numerals, such as smaller-sized numerals than numerals of the current value displayed in the Run mode, at the corner (lower left in this example) of the display section 100. Naturally, the current value may be displayed on the upper left, or in a vertically central portion on the left side, of the display section 100. Further, the current value may be displayed on the upper right, or in a vertically central portion on the right side, of the display section 100.

The same also applies to the case of the display mode that displays a current value and a threshold as the display form in the Run mode, and the current value is preferably displayed in smaller-sized numerals than the numerals of the current value at the time of Run when the display of the display section 100 or 200 is switched to letter information or when letter information is displayed in the detail setting mode.

What is claimed is:

1. A photoelectric sensor optically sensing at least one of a light reception amount and a distance, and outputting either an ON signal or an OFF signal based on a threshold value and a current value representing the at least one of the light amount and the distance, and the current value is automatically updated to correspond to current light reception amount or distance or both, said photoelectric sensor comprising:
    a body having a first surface;
    a dot-matrix display disposed on the first surface and comprising a predetermined display form for a run mode and a predetermined display form for a setting mode, configured to display the current value and a display item according to the predetermined display form for the run mode, and configured to sequentially display each one of a plurality of setting items, and display one of the plurality of setting items according to the predetermined display form for the setting mode,
    wherein the predetermined display form for the run mode and the predetermined display form for the setting mode include one or more display portions which are variable in size and proportion between the predetermined display forms in the run mode and the setting mode,
    the predetermined display form for the run mode includes a main display portion and a second display portion smaller in size than the main display portion,
    the predetermined display form for the setting mode includes the main display portion smaller in size than the main display portion of the first display form for the run mode and an item display portion partially overlapped with the main display portion of the first display form for the run mode; and
    a plurality of buttons including a part of or disposed around the dot-matrix display, configured to switch between the run mode and the setting mode, and configured to adjust the threshold value in the run mode and a plurality of setting items in the setting mode;
    wherein the threshold value is adjusted in response to operation with respect to at least one of the plurality of buttons during displaying the threshold value on the dot-matrix display in the run mode, and each one of the plurality of setting items is sequentially displayed on the dot-matrix display in response to operation with respect to at least one of the plurality of buttons in the setting mode,
    wherein, in the run mode, the current value is displayed in the main display portion of the dot-matrix display and in larger-sized numerals than numerals of the threshold value, and the threshold value being displayed in the second display portion of the dot-matrix display, and
    wherein, in the setting mode, when the one of the plurality of setting items is selected, the current value and the one of the plurality of setting items other than the threshold value are displayed according to the predetermined display form for the setting mode, the one of the plurality of setting items is displayed as a selected condition with letter information indicating the one of the plurality of setting items in the item display portion partially overlapped with the main display portion of the first display form for the run mode, the current value is displayed in the main display portion of the predetermined display form for the setting mode smaller in size than the main display portion of the first display form for the run mode, and the current value is displayed in smaller-sized numerals than numerals of the current value that are displayed on the dot-matrix display in the run mode.

2. The photoelectric sensor according to claim 1, wherein a display form for a display on the dot-matrix display in the run mode is selectable by the user from the plurality of predetermined display forms for the run mode.

3. The photoelectric sensor according to claim 2, wherein when the threshold value has first and second threshold values, the first and second threshold values are laterally displayed in the second display form.

4. The photoelectric sensor according to claim 2, wherein numerals of the threshold value are smaller in size than numerals of the current value in the second display form.

5. The photoelectric sensor according to claim 2, wherein the selectable display forms further include a third display form that displays a current value, a peak value, and a bottom value on the dot-matrix display, and the peak value and the bottom value are displayed in a laterally arrayed state below the current value in the third display form.

6. The photoelectric sensor according to claim 2, wherein in the setting mode, when a setting item which requires display of the current value is displayed on the dot-matrix display, the current value is displayed in smaller-sized numerals than numerals of the current value that are displayed on the dot-matrix display in the run mode.

7. The photoelectric sensor according to claim 6, wherein the selectable display form further includes a fourth display form that displays a current value and a bar display on the dot-matrix display, and the bar display is displayed below the current value in the fourth display form.

8. The photoelectric sensor according to claim 1, wherein the display of the dot-matrix display is switched to an abnormal notification display screen when an abnormality occurs during run of the photoelectric sensor, and on the abnormal notification display screen, letter information is displayed in the main portion of the dot-matrix display, and the current value is displayed in smaller-sized numerals than numerals of the current value that are displayed on the dot-matrix display in the run mode, in a position not interfering with the letter information.

9. The photoelectric sensor according to claim 1, wherein the setting mode has a display form that displays letter information in the main portion of the dot-matrix display and display the current value in a position not interfering with the letter information, and in the display form in the setting mode, the current value is displayed in smaller-sized numerals than numerals of the current value that are displayed on the dot-matrix display in the run mode.

10. The photoelectric sensor according to claim 1, wherein the setting mode includes a manual tuning mode, in the manual tuning mode, the display of the dot-matrix display is changed to a setting screen by one operation by a user during operation of the photoelectric sensor in the run mode, and a current value and a threshold value are displayed on the setting screen, when the threshold value displayed on the setting screen is adjusted by the user's operation, the photoelectric sensor is operated based on the adjusted threshold value, and on a condition that the user's operation is not performed for a predetermined period of time, the threshold value after the adjustment is set and the photoelectric sensor is returned to the display form in the run mode.

11. The photoelectric sensor according to claim 10, wherein numerals of the threshold value are smaller in size than numerals of the current value on the setting screen.

12. A photoelectric sensor optically sensing at least one of a light reception amount and a distance, and outputting either an ON signal or an OFF signal based on a threshold value and a current value representing the at least one of the light amount and the distance, and the current value is automatically updated to correspond to current light reception amount of distance or both, said photoelectric sensor comprising:
   a body having a first surface;
   a dot-matrix display disposed on the first surface and comprising a plurality of predetermined display forms for a run mode and a predetermined display form for a setting mode, configured to display the current value and a display item according to a display form selected from the plurality of predetermined display forms for the run mode, and configured to sequentially display each one of a plurality of setting items, and display one of the plurality of setting items according to the predetermined display form for the setting mode,
   wherein each of the plurality of predetermined display forms for the run mode and the predetermined display form for the setting mode include one or more display portions which are variable in size and proportion between the predetermined display forms in the run mode and the setting mode,
   a first display form of the plurality of predetermined display forms for the run mode includes a main display portion and a second display portion smaller in size than the main display portion,
   a second display form of the plurality of predetermined display forms for the run mode includes the main display portion and two sub display portions partially overlapped with the second display portion of the first display form,
   the predetermined display form for the setting mode includes the main display portion smaller in size than the main display portion of the first display form for the run mode and an item display portion partially overlapped with the main display portion of the first display form for the run mode; and
   a plurality of buttons including a part of or disposed around the dot-matrix display, configured to switch between the run mode and the setting mode, and configured to adjust the threshold value in the run mode and a plurality of setting items in the setting mode;
   wherein, in the run mode, when the first display form is selected, the dot-matrix display displays, in the main portion, the current value in larger-sized numerals than numerals of the threshold value, and displays the threshold value in the second display portion, and the threshold value is adjusted in response to a first operation with respect to at least one of the plurality of buttons during the threshold value being displayed in the second display portion,
   wherein, in the run mode, when the second display form is selected, the current value is displayed in the main display portion of the second display form, and each of two other display items is displayed respectively in each of the two sub display portions partially overlapped with the second display portion of the first display form, and
   wherein, in the setting mode, when the one of the plurality of setting items is selected, the current value and the one of the plurality of setting items other than the threshold value are displayed according to the predetermined display form for the setting mode, the one of the plurality of setting items is displayed as a selected condition with letter information indicating the one of the plurality of setting items in the item display portion partially overlapped with the main display portion of the first display form for the run mode, the current value is displayed in the main display portion of the predetermined display form for the setting mode smaller in size than the main display portion of the first display form for the run mode, and the current value in smaller-sized numerals than numerals of the current value that are displayed, during the run mode, in the main portion.

* * * * *